US011889552B2

(12) United States Patent
Oh et al.

(10) Patent No.: US 11,889,552 B2
(45) Date of Patent: *Jan. 30, 2024

(54) METHOD AND APPARATUS FOR SETTING DOWNLINK CONTROL CHANNEL RECEPTION TIME IN WIRELESS COMMUNICATION SYSTEM

(71) Applicant: Samsung Electronics Co., Ltd., Suwon-si (KR)

(72) Inventors: Jinyoung Oh, Seoul (KR); Sungjin Park, Incheon (KR); Jeongho Yeo, Hwaseong-si (KR); Heedon Gha, Suwon-si (KR); Taehan Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,994

(22) Filed: May 23, 2022

(65) Prior Publication Data

US 2022/0287087 A1 Sep. 8, 2022

Related U.S. Application Data

(63) Continuation of application No. 16/631,001, filed as application No. PCT/KR2018/008025 on Jul. 16, 2018, now Pat. No. 11,343,852.

(30) Foreign Application Priority Data

Jul. 14, 2017 (KR) ........................ 10-2017-0089735

(51) Int. Cl.
*H04W 24/08* (2009.01)
*H04W 74/08* (2009.01)
(Continued)

(52) U.S. Cl.
CPC ....... *H04W 74/0808* (2013.01); *H04W 16/14* (2013.01); *H04W 24/08* (2013.01);
(Continued)

(58) Field of Classification Search
CPC ............ H04W 74/0808; H04W 24/08; H04W 72/042
See application file for complete search history.

(56) References Cited

U.S. PATENT DOCUMENTS 8,787,281 B2 7/2014 Takeda et al.
2013/0028108 A1 1/2013 Wu et al.
(Continued)

FOREIGN PATENT DOCUMENTS

CN 102404857 A 4/2012
CN 105359604 A 2/2016
(Continued)

OTHER PUBLICATIONS

Korean Office Action dated May 24, 2021, issued in Korean Application No. 10-2017-0089735.
(Continued)

*Primary Examiner* — Zhiren Qin
(74) *Attorney, Agent, or Firm* — Jefferson IP Law, LLP

(57) ABSTRACT

Disclosed are a communication technique for merging, with IoT technology, a 5G communication system for supporting a data transmission rate higher than that of a 4G system, and a system therefor. The present disclosure can be applied to intelligent services (for example, smart home, smart building, smart city, smart car or connected car, healthcare, digital education, retail, security, and safety-related services) on the basis of 5G communication technology and IoT-related technology. The present invention relates to a method and an apparatus for receiving a downlink control channel in a wireless communication system. Particularly, the present invention provides a method and an apparatus allowing a (Continued)

terminal to vary, according to base station settings or instructions, a reception time or reception timing, for a downlink control channel, transmitted from a base station.

20 Claims, 11 Drawing Sheets

(51) Int. Cl.
  *H04W 16/14* (2009.01)
  *H04W 80/08* (2009.01)
  *H04W 72/0446* (2023.01)
  *H04W 72/23* (2023.01)

(52) U.S. Cl.
  CPC ....... *H04W 72/0446* (2013.01); *H04W 72/23* (2023.01); *H04W 80/08* (2013.01)

(56) References Cited

U.S. PATENT DOCUMENTS

| | | | |
|---|---|---|---|
| 2013/0155997 A1 | 6/2013 | Cai et al. | |
| 2013/0343307 A1 | 12/2013 | Desai et al. | |
| 2014/0003349 A1* | 1/2014 | Kang | H04L 1/0046 370/328 |
| 2014/0177582 A1* | 6/2014 | Wu | H04W 72/00 370/329 |
| 2014/0321399 A1 | 10/2014 | Liu et al. | |
| 2015/0341914 A1 | 11/2015 | Lee et al. | |
| 2016/0219557 A1 | 7/2016 | He et al. | |
| 2016/0227425 A1 | 8/2016 | Kim et al. | |
| 2016/0366594 A1 | 12/2016 | Chang et al. | |
| 2017/0202018 A1 | 7/2017 | Cha et al. | |
| 2018/0077688 A1* | 3/2018 | Yi | H04W 16/14 |
| 2018/0324845 A1* | 11/2018 | Wang | H04L 5/0092 |
| 2018/0343667 A1* | 11/2018 | Li | H04L 5/0053 |
| 2020/0015277 A1* | 1/2020 | Shi | H04L 5/0044 |
| 2020/0059904 A1* | 2/2020 | Takeda | H04W 72/23 |
| 2020/0204305 A1* | 6/2020 | Stern-Berkowitz | H04W 72/23 |

FOREIGN PATENT DOCUMENTS

| | | |
|---|---|---|
| KR | 10-2013-0007642 A | 1/2013 |
| KR | 10-2014-0121436 A | 10/2014 |
| KR | 10-2015-0112939 A | 10/2015 |
| KR | 10-2016-0094877 A | 8/2016 |
| KR | 10-2018-0091527 A | 8/2018 |
| WO | 2016/048081 A1 | 3/2016 |
| WO | 2016/163656 A1 | 10/2016 |
| WO | 2017/065666 A1 | 4/2017 |

OTHER PUBLICATIONS

Korean Notice of Allowance dated Nov. 17, 2021, issued in Korean Application No. 10-2017-0089735.
Indian Office Action dated May 26, 2022, issued in Indian Application No. 202138029298.
Chinese Office Action dated Nov. 1, 2023, issued in Chinese Application No. 201880054116.X.

\* cited by examiner

METHOD AND APPARATUS FOR SETTING DOWNLINK CONTROL CHANNEL RECEPTION TIME IN WIRELESS COMMUNICATION SYSTEM

CROSS-REFERENCE TO RELATED APPLICATION(S)

This application is a continuation application of prior application Ser. No. 16/631,001, filed on Jan. 14, 2020, which has issued as U.S. Pat. No. 11,343,852 on May 24, 2022, which is a U.S. National Stage application under 35 U.S.C. § 371 of an International application number PCT/KR2018/008025, filed on Jul. 16, 2018, which is based on and claims priority of a Korean patent application number 10-2017-0089735, filed on Jul. 14, 2017, in the Korean Intellectual Property Office, the disclosure of which is incorporated by reference herein in its entirety.

TECHNICAL FIELD

The disclosure relates to a method and an apparatus for receiving downlink control channel in a wireless communication system, and more specifically to a method in which a terminal (UE) changes a reception time or reception timing of a downlink control channel transmitted from a base station according to configuration or indication of the base station.

BACKGROUND ART

In order to meet wireless data traffic demands, which have increased since the commercialization of a 4G communication system, efforts to develop an improved 5G communication system or a pre-5G communication system have been made. For this reason, the 5G communication system or the pre-5G communication system is called a beyond-4G-network communication system or a post-LTE system. In order to achieve a high data transmission rate, implementation of the 5G communication system in an mmWave band (for example, 60 GHz band) is being considered. In the 5G communication system, technologies such as beamforming, massive MIMO, full-dimensional MIMO (FD-MIMO), array antennas, analog beam-forming, and large-scale antennas are being discussed as means to mitigate a propagation path loss in the mmWave band and increase a propagation transmission distance. Further, in order to improve the system network, in the 5G communication system, development has progressed on technologies, such as an evolved small cell, an advanced small cell, a cloud radio access network (cloud RAN), an ultra-dense network, device-to-device communication (D2D), a wireless backhaul, a moving network, cooperative communication, coordinated multi-points (CoMP), and reception interference cancellation. In addition, in the 5G system, development has progressed on advanced coding modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA).

Meanwhile, the Internet has evolved from a human-oriented connection network in which humans generate and consume information to an Internet-of-Things (IoT) network in which distributed components such as objects exchange and process information. Internet-of-Everything (IoE) technology in which big-data processing technology through a connection with a cloud server or the like is combined with the IoT technology has emerged. In order to implement the IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, through collection and analysis of data generated in connected objects, an intelligent Internet technology (IT) service to create new value for peoples' lives may be provided. The IoT may be applied to fields, such as a smart home, a smart building, a smart city, a smart car, a connected car, a smart grid, health care, smart home appliances, or a high-tech medical service, through convergence between the conventional information technology (IT) and various industries.

Accordingly, various attempts to apply a 5G communication system to the IoT network are being made. For example, 5G communication technology, such as a sensor network, machine-to-machine (M2M) communication, and machine-type communication (MTC), has been implemented using techniques such as beamforming, MIMO, and array antennas. The application of a cloud RAN as big-data processing technology described above may be an example of convergence of 5G technology and IoT technology.

In the 5G system, it is possible to transmit or receive a signal to or from a UE by using an unlicensed band. Whether to use the unlicensed band is determined based on whether the unlicensed band is idle. Specifically, when downlink transmission is performed in an unlicensed band or by a cell or base station operating in the unlicensed band, the base station performs a channel access procedure or a listen-before-talk (LBT) for the unlicensed band, in which the downlink transmission has been configured, in advance of or immediately before a configured downlink transmission start time point. When the unlicensed band is determined to be idle as a result of performing the channel access procedure, the base station may perform the downlink signal transmission. Meanwhile, when the unlicensed band is determined not to be idle according to the channel access procedure performed by the base station, the base station cannot perform the configured downlink signal transmission.

Therefore, it is preferable that the base station transfer a downlink signal (e.g. downlink control information (DCI) including uplink/downlink resource allocation information) to the UE immediately when the unlicensed band is determined to be idle after the channel access procedure is performed. To this end, the UE configured to transmit or receive a signal in the unlicensed band very frequently receives downlink control information transmitted by the base station, and must always determine, from the received downlink control information, whether uplink/downlink resource allocation information of the UE has been transferred. When the UE frequently receives or detects the downlink control information, the UE unnecessarily consumes power in receiving and decoding the downlink control information, and thus the performance thereof may be degraded. Therefore, there is the need for a method for adaptively adjusting the downlink control information reception time or period of the UE according to the result of performing the channel access procedure.

DISCLOSURE OF INVENTION

Technical Problem

The disclosure proposes an apparatus and a method wherein a UE receives, from a base station, configuration for one or more downlink control information reception times or periods, or an instruction or reconfiguration for at least one time or period among the downlink control information reception times or periods.

Solution to Problem

In order to solve the above-described problems, the disclosure provides a method of a UE in a wireless communication system, the method including: monitoring a downlink control channel in an unlicensed band, based on a first period for the downlink control channel; when first downlink control information is received based on the first period, monitoring the downlink control channel, based on a second period for the downlink control channel; and receiving second downlink control information, based on the first downlink control information, wherein the first downlink control information relates to an occupancy interval of a base station. Further, the first downlink control information may include at least one of multiple slot format indicators and information on a downlink transmission interval and an uplink transmission interval. The second downlink control information may be UE-specific control information. The period for the downlink control channel may be configured by higher-layer signaling, and the first control information may include information on the second period for the downlink control channel.

Further, a method of a base station in a wireless communication system includes: performing a channel access procedure in an unlicensed band; when the unlicensed band is found to be idle as a result of the channel access procedure, transmitting first downlink control information by using the unlicensed band on a downlink control channel, based on a first period for the downlink control channel; and transmitting second downlink control information by using the unlicensed band, based on a second period for the downlink control channel, wherein the first downlink control information relates to an occupancy interval of the base station.

Further, a UE in a wireless communication system includes: a transceiver; and a controller connected to the transceiver and configured to: monitor a downlink control channel in an unlicensed band, based on a first period for the downlink control channel; when first downlink control information is received based on the first period, monitor the downlink control channel, based on a second period for the downlink control channel; and receive second downlink control information, based on the first downlink control information, wherein the first downlink control information relates to an occupancy interval of a base station.

Further, a base station in a wireless communication system includes: a transceiver; and a controller connected to the transceiver and configured to: perform a channel access procedure in an unlicensed band; when the unlicensed band is found to be idle as a result of the channel access procedure, transmit first downlink control information by using the unlicensed band on a downlink control channel, based on a first period for the downlink control channel; and transmit second downlink control information by using the unlicensed band, based on a second period for the downlink control channel, wherein the first downlink control information relates to an occupancy interval of the base station.

Advantageous Effects of Invention

According to an embodiment of the disclosure, a UE receives, from a base station, configuration for one or more downlink control information reception times or periods, or receives an instruction or reconfiguration for at least one time or period among the downlink control information reception times or periods. Therefore, the UE can change the configured downlink control information reception time or period and receive control information, and thus can minimize the consumption of power by the UE in receiving downlink control information.

MODE FOR THE INVENTION

Figure 1:
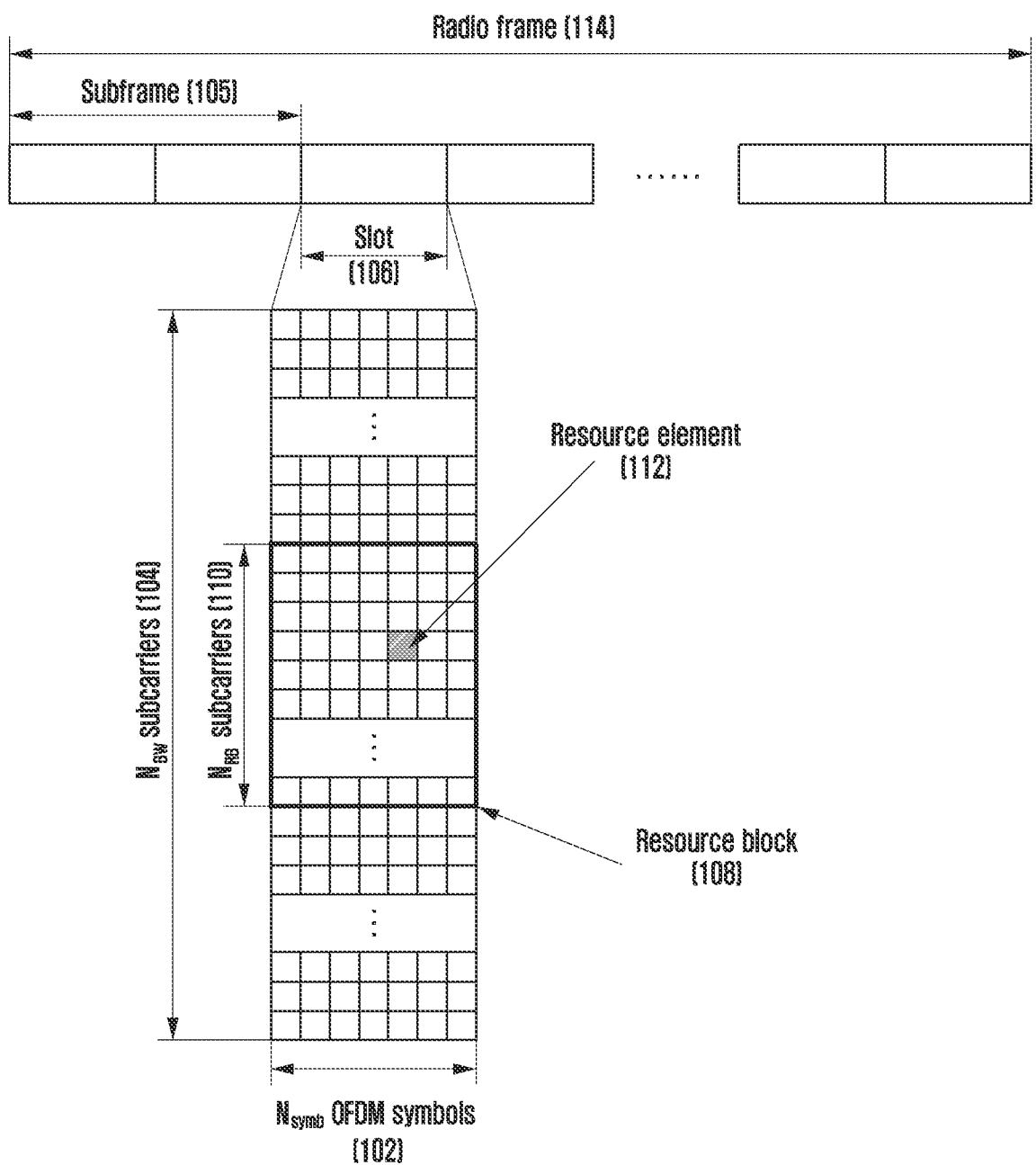
FIG. 1 illustrates a downlink time-frequency domain transmission structure of an LTE or LTE-A system.

In describing the embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and to more clearly transfer the main idea.

For the same reason, in the accompanying drawings, some elements may be exaggerated, omitted, or schematically illustrated. Further, the size of each element may not accurately reflect the actual size. In the drawings, identical or corresponding elements are provided with identical reference numerals.

The advantages and features of the disclosure and methods of achieving the same will be made apparent by referring to the embodiments described below in detail in conjunction with the accompanying drawings. However, the disclosure is not limited to the embodiments set forth below, and may be implemented in various different forms. The following embodiments are provided only to make the disclosure complete and completely inform those skilled in the art to which the disclosure belongs of the scope of the disclosure. The disclosure is defined only by the scope of the claims. Throughout the specification, the same reference numerals designate the same elements.

Here, it will be understood that each block of the flowchart illustrations and a combination of the flowchart illustrations can be carried out by computer program instructions. These computer program instructions can be provided to a processor of a general-purpose computer, special-purpose computer, or other programmable data-processing apparatus to produce a machine. Thus, the instructions, which are executed via the processor of the computer or other programmable data-processing apparatus, create means for performing the functions specified in the flowchart block(s). These computer program instructions may also be stored in a computer-usable or computer-readable memory that can direct a computer or other programmable data-processing apparatus to function in a particular manner Thus, the instructions stored in the computer-usable or computer-readable memory may produce an article of manufacture including instruction means that perform the function specified in the flowchart block(s). The computer program instructions may also be loaded onto a computer or other programmable data-processing apparatus to cause a series of operational steps to be performed on the computer or other programmable data-processing apparatus to produce a computer-implemented process such that the instructions executed on the computer or other programmable data-processing apparatus provide steps for implementing the functions specified in the flowchart block(s).

Further, each block of the flowchart illustrations may represent a module, a segment, or a portion of code that includes one or more executable instructions for executing the specified logical function(s). It should also be noted that in some alternative implementations, the functions noted in the blocks may occur out of the order. For example, two blocks shown in succession may in fact be executed substantially concurrently, or the blocks may sometimes be executed in the reverse order, depending upon the functionality involved.

The term "unit" used in the present embodiment refers to a software element or a hardware element, such as an FPGA or an ASIC, which performs a predetermined function. However, "unit" does not always have a meaning limited to software or hardware. The "unit" may be configured either to be stored in an addressable storage medium or to reproduce one or more processors. Therefore, the "unit" includes, for example, elements such as software elements, object-oriented software elements, class elements and task elements, processes, functions, properties, procedures, subroutines, segments of program code, drivers, firmware, micro-code, circuits, data, databases, data structures, tables, arrays, and parameters. The elements and functions provided by the "unit" may also be combined into a smaller number of elements and "units" or may be divided into a larger number of elements and "units". Moreover, the elements and "units" may be implemented to reproduce one or more CPUs within a device or a security multimedia card. Also, in an embodiment, the "unit" may include one or more processors.

A wireless communication system has developed into a broadband wireless communication system that provides a high-speed and high-quality packet data service, such as the communication standards, for example, high-speed packet access (HSPA) of 3GPP, long-term evolution (LTE) or evolved universal terrestrial radio access (E-UTRA), LTE-advanced (LTE-A), high-rate packet data (HRPD) of 3GPP2, ultra-mobile broadband (UMB), and IEEE 802.16e, beyond the initially provided voice-based service. Further, communication standards for 5G or new radio or next radio (NR), which is a fifth-generation wireless communication system, are being made.

As described above, in a wireless communication system including a fifth-generation system, at least one service among enhanced mobile broadband (eMBB), massive machine-type communications (mMTC), and ultra-reliable and low-latency communications (URLLC) may be provided to a UE. The above services may be provided to the same UE during the same time interval. In the present embodiment, eMBB may be a service for high-speed transmission of high-volume data, mMTC may be a service for UE power minimization and connection of multiple UEs, and URLLC may be a service for high reliability and low delay, but the services are not limited thereto. The three services may be important scenarios in an LTE system or a 5G or NR system after LTE.

Hereinafter, an embodiment of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may differ according to users, intentions of the users, or customs. Therefore, the definitions of the terms should be made based on the content throughout the specification.

Hereinafter, a base station is a subject for performing resource allocation for a UE, and may be at least one among eNode B, Node B, a base station (BS), a wireless connection unit, a base station controller, or a node on a network. A UE may include user equipment (UE), a mobile station (MS), a cellular phone, a smartphone, a computer, or a multimedia system capable of performing a communication function. In the disclosure, a downlink (DL) is a wireless transmission path of a signal which a base station transmits to a UE, and an uplink (UL) is a wireless transmission path of a signal which a UE transmits to a base station.

Hereinafter, an embodiment of the disclosure will be described as an example of an LTE or LTE-A system. However, the embodiment of the disclosure may be applied to other communication systems having a similar technical background or channel form. For example, fifth-generation mobile communication technologies (5G, new radio, NR) may be included herein. Further, the embodiment of the disclosure may be applied to other communication systems through some modifications according to the determination of those skilled in the art without largely deviating from the scope of the disclosure.

An LTE system, which is a representative example of the broadband wireless communication system, adopts an orthogonal frequency-division multiplexing (OFDM) method in a downlink and a single carrier frequency-division multiple access (SC-FDMA) method in an uplink. In multiple access methods as described above, data or control information of each user is classified by assigning and operating time-frequency resources for carrying data or control information for each user such that the time-frequency resources do not overlap each other, that is, such that orthogonality is established.

The LTE system employs a hybrid automatic repeat request (HARQ) method of retransmitting the corresponding data in a physical layer when decoding fails upon the initial transmission. When a receiver fails to accurately decode data, the HARQ method enables the receiver to transmit information for providing notification of the decoding failure (negative acknowledgement (NACK)) to a transmitter so that the transmitter can retransmit the corresponding data in a physical layer. The receiver may combine the data retransmitted by the transmitter with data that failed to be decoded, thereby increasing data reception performance. Further, when the receiver accurately decodes data, the receiver transmits information (acknowledgement (ACK)) reporting that decoding was successfully executed, so that the transmitter transmits new data.

FIG. 1 illustrates a basic structure of time-frequency domain, which is a radio resource domain in which data or a control channel is transmitted in a downlink of an LTE or LTE-A system.

Referring to FIG. 1, the horizontal axis represents the time domain and the vertical axis represents the frequency domain. The minimum transmission unit in the time domain is an OFDM symbol. $N_{symb}$ OFDM symbols 120 constitute one slot 106, and two slots form one subframe 105. The length of the slot is 0.5 ms and the length of the subframe is 1.0 ms. A radio frame 114 is a time-domain interval including ten subframes. The minimum transmission unit in the frequency domain is a subcarrier, and the entire system transmission bandwidth includes a total of $N_{BW}$ subcarriers 104. However, such specific values may be variably applied.

In a time-frequency domain, the basic unit of a resource is a resource element (RE) 112, which may be represented by an OFDM symbol index and a subcarrier index. A resource block (RB) or physical resource block (PRB) 108 is defined as $N_{symb}$ consecutive OFDM symbols 102 in the time domain and $N_{RB}$ consecutive subcarriers 110 in the frequency domain. Thus, one RB 108 in one slot may include $N_{symb} \times N_{RB}$ REs 112. In general, the minimum allocation unit of data in the frequency domain is the RB 108. In the LTE system, in general, $N_{symb}=7$ and $N_{RB}=12$, and $N_{BW}$ may be proportional to a system transmission bandwidth. The data rate increases in proportion to the number of RBs scheduled to a UE. The LTE system can define and operate six transmission bandwidths.

In the case of a frequency-division duplexing (FDD) system in which the downlink and the uplink are separated by frequency and are operated, the downlink transmission bandwidth and the uplink transmission bandwidth may be different from each other. A channel bandwidth indicates an RF bandwidth corresponding to a system transmission bandwidth. Table 1, provided below, shows the relationship between a system transmission bandwidth and a channel bandwidth defined in the LTE system. For example, an LTE system having a 10 MHz channel bandwidth may have a transmission bandwidth of 50 RBs.

TABLE 1

| Channel Bandwidth $BW_{channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Downlink control information may be transmitted within the first N OFDM symbols in the subframe. In the present embodiment, N={1, 2, 3} in general. Therefore, the value of N can be variably applied to each subframe according to the amount of control information to be transmitted in the current subframe. The control information to be transmitted may include a control channel transmission interval indicator indicating the number of OFDM symbols at which control information is transmitted, scheduling information for downlink data or uplink data, and HARQ ACK/NACK information.

In the LTE system, the scheduling information for downlink data or uplink data may be transmitted from a base station to a UE through downlink control information (DCI). DCI is defined according to various formats, and may indicate, according to each format, whether DCI is scheduling information (UL grant) for uplink data or scheduling information (DL grant) for downlink data, whether DCI is compact DCI having a small size of control information, whether to apply spatial multiplexing using multiple antennas, whether or not DCI is used for power control, and the like. For example, DCI format 1, which is the scheduling control information (DL grant) for downlink data, may include at least one of the following types of control information.

Resource allocation type 0/1 flag: Indicates whether a resource allocation type is type 0 or type 1. Type 0 allocates resources in units of resource block groups (RBG) by applying a bitmap scheme. In the LTE system, the basic unit of scheduling is an RB, represented by time and frequency domain resources, and an RBG includes multiple RBs and becomes the basic unit of scheduling in the type 0 scheme. Type 1 allows a specific RB to be allocated within the RBG.

Resource block assignment: Indicates an RB allocated to data transmission. The resources to be represented are determined according to a system bandwidth and a resource allocation scheme.

Modulation and coding scheme (MCS): Indicates the modulation scheme used for data transmission and the size of the transport block to be transmitted.

HARQ process number: Indicates the process number of HARQ.

New data indicator: Indicates whether HARQ is initial transmission or retransmission.

Redundancy version: Indicates the redundancy version of HARQ.

Transmit power control (TPC) command for physical uplink control channel (PUCCH): Indicates a transmit power control command for a PUCCH which is an uplink control channel.

The DCI undergoes channel coding and modulation and may then be transmitted on a physical downlink control channel (PDCCH) or an enhanced PDCCH (EPDCCH), which is a downlink physical control channel Hereinafter, PDCCH transmission/reception and DCI transmission/reception on PDCCH may be used together. Similarly, downlink data transmission/reception and physical downlink shared channel (PDSCH) transmission/reception may be used together. Also, uplink data transmission/reception and physical uplink shared channel (PUSCH) transmission/reception may be used together.

Generally, the DCI is scrambled with a predetermined radio network temporary identifier (RNTI) (or a UE identifier), independently for each UE, a cyclic redundancy check (CRC) is added, and channel coding is performed, whereby each independent PDCCH is configured and transmitted. In the time domain, the PDCCH is mapped and transmitted during the control channel transmission interval. The frequency-domain mapping position of the PDCCH may be determined by the ID of each UE, and may be spread over the entire system transmission band.

Downlink data may be transmitted on PDSCH, which is a physical channel for downlink data transmission. The PDSCH may be transmitted after the control channel transmission interval, and scheduling information such as a specific mapping position and a modulation scheme in the frequency domain is determined based on the DCI transmitted through the PDCCH.

A base station notifies a UE of the modulation scheme applied to a PDSCH to be transmitted and a transport block size (TBS), which is the size of data to be transmitted, through MCS among control information constituting the DCI. In the embodiment, the MCS may include 5 bits, or larger or smaller number of bits. The TBS corresponds to a size before channel coding for error correction is applied to data (TB) to be transmitted by the base station.

The modulation schemes supported by the LTE system are quadrature phase-shift keying (QPSK), 16 quadrature amplitude modulation (16 QAM), and 64 QAM, and modulation orders ($Q_m$) thereof correspond to 2, 4, and 6, respectively. That is, it is possible to transmit 2 bits per symbol for QPSK modulation, 4 bits per symbol for 16 QAM modulation, and 6 bits per symbol for 64 QAM modulation. In addition, modulation of 256QAM or higher may be used according to the system modification.

Figure 2:
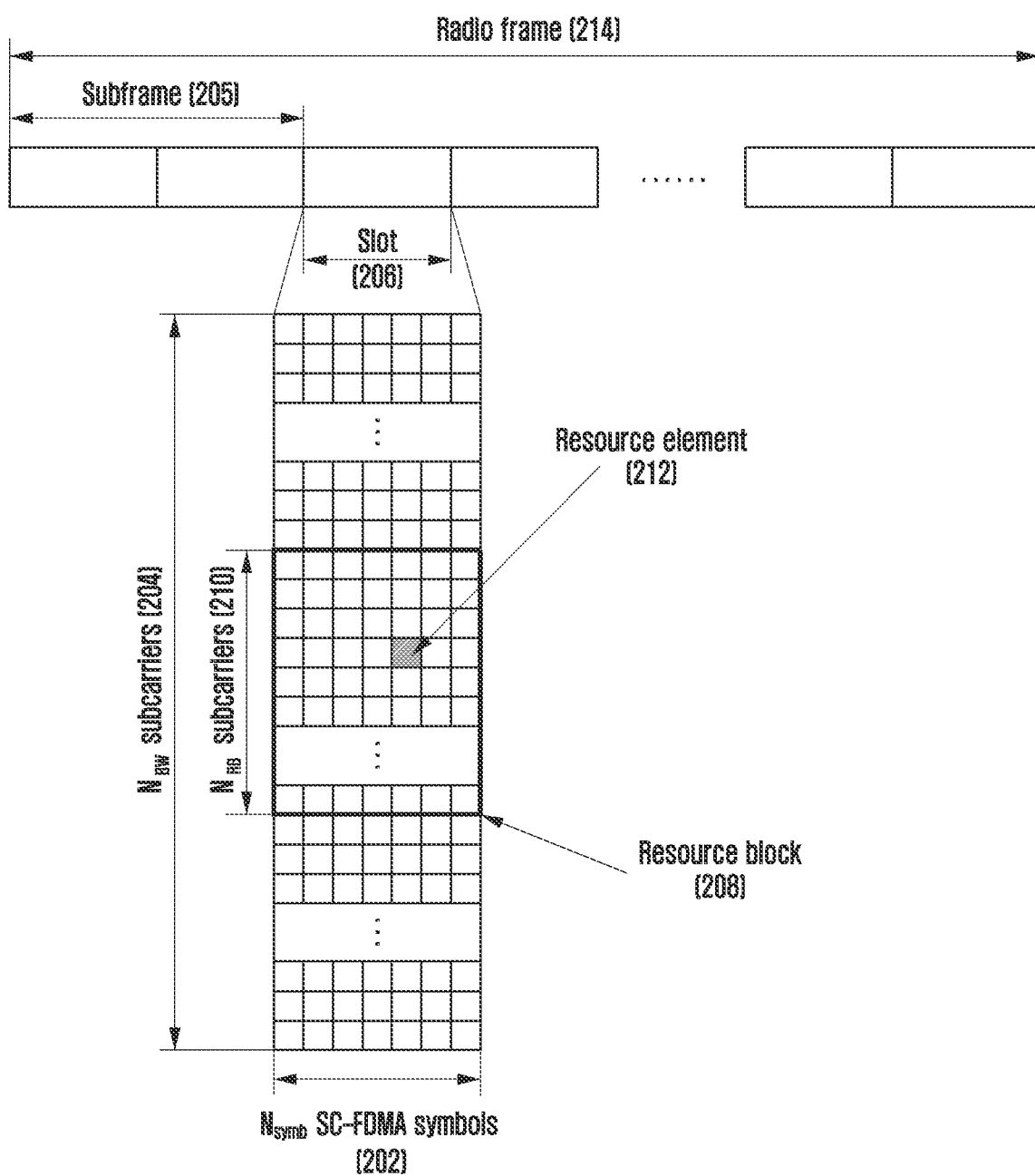
FIG. 2 illustrates an uplink time-frequency domain transmission structure of an LTE or LTE-A system.

FIG. 2 illustrates a basic structure of a time-frequency domain, which is a radio resource domain in which data or a control channel is transmitted in an uplink of an LTE or LTE-A system.

Referring to FIG. 2, the horizontal axis represents a time domain and the vertical axis represents a frequency domain. The minimum transmission unit in the time domain is an SC-FDMA symbol, and $N_{symb}$ SC-FDMA symbols 202 may form one slot 206. Then, two slots form one subframe 205. The minimum transmission unit in the frequency domain is a subcarrier, and the entire system transmission bandwidth includes a total of $N_{BW}$ subcarriers 204. $N_{BW}$ may have a value proportional to the system transmission bandwidth.

The basic unit of resources in the time-frequency domain is a resource element (RE) 212, which can be defined as an SC-FDMA symbol index and a subcarrier index. A resource block (RB) 208 may be defined as $N_{symb}$ consecutive SC-FDMA symbols in the time domain and $N_{RB}$ consecutive subcarriers in the frequency domain. Therefore, one RB includes $N_{symb} \times N_{RB}$ REs. In general, the minimum transmission unit of data or control information is an RB unit. A PUCCH is mapped to a frequency domain corresponding to one RB and is transmitted for one subframe.

In the LTE system, it is possible to define the transmission timing relationship between a PDSCH or a PDCCH or EPDDCH including a semi-persistent scheduling release (SPS release), which is a downlink data transmission physical channel, and a PUCCH or PUSCH, which is an uplink physical channel on which HARQ ACK/NACK corresponding to the PDCCH or EPDDCH is transmitted. For example, in an LTE system operating according to FDD, an HARQ ACK/NACK, corresponding to a PDCCH or EPDCCH including an SPS release or a PDSCH, transmitted in an (n−4)th subframe may be transmitted on a PUCCH or a PUSCH in an nth subframe.

In the LTE system, a downlink HARQ employs an asynchronous HARQ scheme in which the data retransmission time point is not fixed. That is, when a station receives feedback of an HARQ NACK from a UE with respect to data initially transmitted by the base station, the base station freely determines, through a scheduling operation, the transmission time point of data to be retransmitted. For an HARQ operation, the UE may buffer data determined to be erroneous as a result of decoding of the received data and perform combining with the data retransmitted from the base station.

The HARQ ACK/NACK information of PDSCH transmitted in subframe n-k may be transmitted from a UE to a base station through a PUCCH or PUSCH in subframe n. Here, k may be defined differently depending on FDD or time division duplex (TDD) of the LTE system and on the subframe configuration. For example, in the case of the FDD LTE system, k is fixed to 4. On the other hand, in the case of the TDD LTE system, k may be changed according to a subframe configuration and a subframe number. Also, the value of k may be applied differently depending on the TDD configuration of each carrier at the time of data transmission through multiple carriers. In the case of TDD, the value of k is determined depending on TDD UL/DL configuration, as shown in Table 2.

TABLE 2

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the LTE system, unlike downlink HARQ, uplink HARQ adopts a synchronous HARQ scheme in which the data transmission time point is fixed. That is, the uplink/downlink timing relationship among a PUSCH, which is a physical channel for uplink data transmission, a PDCCH, which is a downlink control channel preceding the PUSCH, and a physical hybrid indicator channel (PHICH), which is a physical channel on which HARQ ACK/NACK corresponding to the PUSCH is transmitted, may be determined by the following rule.

When the UE receives a PDCCH including uplink scheduling control information transmitted from the base station in subframe n or a PHICH in which downlink HARQ ACK/NACK is transmitted, the UE transmits uplink data corresponding to the control information through a PUSCH in subframe n+k. Here, k may be defined differently depending on FDD or TDD of the LTE system and on the configuration thereof. For example, in the case of an FDD LTE system, k may be fixed to 4. On the other hand, in the case of a TDD LTE system, k may be changed according to a subframe configuration and a subframe number. Also, the value of k may be applied differently depending on the TDD configuration of each carrier at the time of data transmission through multiple carriers. In the case of the TDD, the value of k is determined according to a TDD UL/DL configuration as in Table 3.

TABLE 3

| TDD UL/DL configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |

TABLE 3-continued

| TDD UL/DL configuration | 0 | 1 | 2 | 3 | 4 | 5 | 6 | 7 | 8 | 9 |
|---|---|---|---|---|---|---|---|---|---|---|
| 2 |   |   |   | 4 |   |   |   |   | 4 |   |
| 3 | 4 |   |   |   |   |   |   |   | 4 | 4 |
| 4 |   |   |   |   |   |   |   |   | 4 | 4 |
| 5 |   |   |   |   |   |   |   |   | 4 |   |
| 6 |   | 7 | 7 |   |   |   | 7 | 7 |   | 5 |

HARQ-ACK information of a PHICH to be transmitted in subframe i is associated with a PUSCH transmitted in subframe i−k. In the FDD system, k is provided as 4. That is, in the FDD system, HARQ-ACK information of the PHICH to be transmitted in subframe i is associated with a PUSCH transmitted in subframe i−4. In the case of the TDD system, when only one serving cell is configured for a UE in which enhanced interference mitigation and traffic adaptation (EIMTA) is not configured, or when multiple cells are all configured through the same TDD UL/DL configuration, in the TDD UL/DL configuration 0 to 6, the value of k may be provided according to Table 4 below.

TABLE 4

| TDD UL/DL configuration | 0 | 1 | 2 | 3 | 4 | 5 | 6 | 7 | 8 | 9 |
|---|---|---|---|---|---|---|---|---|---|---|
| 0 | 7 | 4 |   |   |   |   | 7 | 4 |   |   |
| 1 |   | 4 |   |   | 6 |   | 4 |   |   | 6 |
| 2 |   |   |   | 6 |   |   |   |   | 6 |   |
| 3 | 6 |   |   |   |   |   |   |   | 6 | 6 |
| 4 |   |   |   |   |   |   |   |   | 6 | 6 |
| 5 |   |   |   |   |   |   |   |   | 6 |   |
| 6 | 6 | 4 |   |   |   |   | 7 | 4 |   | 6 |

For example, when TDD UL/DL configuration 1 is applied, a PHICH to be transmitted in subframe 6 may be HARQ-ACK information of a PUSCH transmitted in subframe 2 which is ahead by four subframes.

In the case of TDD UL/DL configuration 0, when HARQ-ACK is received in a PHICH resource corresponding to $I_{PHICH}=0$, the PUSCH indicated by the HARQ-ACK information is a channel transmitted in subframe i−k, and the value of k is provided according to Table 4. In the case of TDD UL/DL configuration 0, when HARQ-ACK is received as a PHICH resource corresponding to $I_{PHICH}=1$, the PUSCH indicated by the HARQ-ACK information is a channel transmitted in subframe i−6.

In the case of an LTE system that performs downlink or uplink communication in an unlicensed band (hereinafter, referred to as a licensed assisted access (LAA) system), a base station or a UE should determine, before the transmission of a downlink or uplink signal, the idle state of an unlicensed band in which communication is performed. For example, when the size of a signal received in the unlicensed band is smaller than a specific threshold value for a predetermined period of time, the base station or the UE may perform signal transmission to the unlicensed band. Accordingly, when the UE transmits an uplink signal in the LAA system, the base station determines the idle state of the unlicensed band, and when the unlicensed band is determined to be idle, the base station may transmit, to the UE, a PDCCH including uplink scheduling control information for configuring uplink data transmission of the UE.

The description of the wireless communication system is based on an LTE system, but the content of the disclosure is not limited to the LTE system, and may be applied to various wireless communication systems such as NR and 5G. Also, when the embodiment is applied to wireless communication systems other than LTE, the value of k may be changed and applied to a system using a modulation scheme corresponding to FDD.

Figure 3:
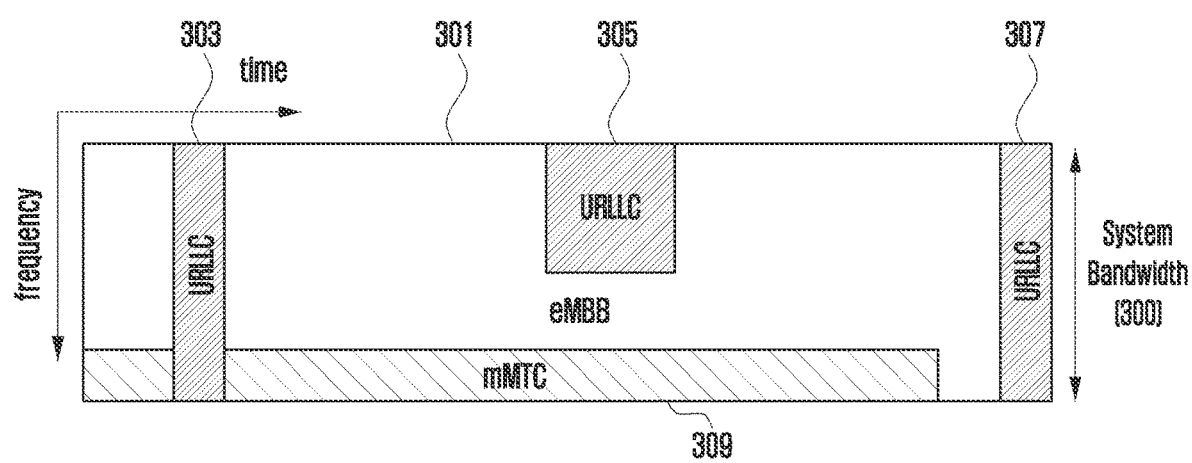
FIG. 3 illustrates an example in which data for eMBB, URLLC, and mMTC in a communication system are allocated from a frequency-time resource.

FIG. 3 illustrates an example in which data for eMBB, URLLC, and mMTC, which are services considered in a 5G or NR system, are allocated in frequency-time resources.

Referring to FIG. 3, it can be found that a scheme is depicted in which frequency and time resources are allocated for information transmission in each system. eMBB, URLLC, and mMTC data are allocated in the entire system frequency band 300. When URLLC data 303, 305, and 307 are generated while eMBB data 301 and mMTC data 309 are allocated and transmitted in a specific frequency band, and thus transmission of the generated URLLC data is necessary, a transmitter may empty a part in which the eMBB data 301 and the mMTC data 309 have already been allocated, and may then transmit the URLLC data 303, 305, and 307, or may transmit the URLLC data 303, 305, and 307 without performing scheduled transmission. Among the above services, since URLLC requires a reduced delay time, URLLC data may be allocated (303, 305, and 307) to a portion of the resource 301 to which the eMBB is allocated, and may be transmitted. Of course, when URLLC is additionally allocated and transmitted in the resource to which the eMBB is allocated, the eMBB data may not be transmitted in the overlapping frequency-time resource, and thus the transmission performance of the eMBB data may be lowered. That is, in the above case, eMBB data transmission failure due to URLLC allocation may occur.

Generally, the length of a transmission time interval (TTI) used for URLLC transmission may be shorter than the length of a TTI used for eMBB or mMTC transmission. Further, a transmitter may transmit a response to information related to the URLLC faster than eMBB or mMTC, and thus information may be transmitted or received with a low delay.

The structure of a physical layer channel used for each type to transmit the three types of services or data may be different. For example, at least one among the length of a TTI, subcarrier spacing, the allocation unit of frequency resources, the structure of a control channel, and the method of mapping data may be different.

In the above description, three types of services and three types of data have been described. However, more types of services and data corresponding thereto may exist, in which case the content of the disclosure may also be applied.

The terms, physical channel and signal in the conventional LTE or LTE-A system, may be used to describe the method and apparatus proposed by the embodiment. However, the content of the disclosure may be applied to wireless communication systems other than LTE and LTE-A systems.

In the disclosure, higher-layer signaling or a higher-layer signal is a signal transmission method in which a signal is transmitted from a base station to a UE by using a downlink data channel of a physical layer or from a UE to a base station by using an uplink data channel of a physical layer, and includes RRC signaling, PDCP signaling, or a signal transmission method in which a signal is transmitted through a MAC control element (MAC CE).

The content of the disclosure is described with reference to a LAA system, but may also be applicable to an FDD system, a TDD system, and an NR system. In addition, the content of the disclosure may be applicable to a standalone system operating only in the unlicensed band without the assistance of the licensed band.

When downlink transmission is performed in an unlicensed band or from a cell or a base station operating in an unlicensed band, the base station performs a channel access procedure (or listen-before talk (LBT)) for the unlicensed band, in which a downlink signal is desired to be transmitted, before or immediately before the start of downlink signal transmission. When it is determined in the performed channel access procedure that the unlicensed band is idle, the base station may perform the downlink signal transmission. Meanwhile, when it is determined that the unlicensed band is not idle according to the channel access procedure performed by the base station, the base station cannot perform the downlink signal transmission.

In the channel access procedure in the unlicensed band in which the downlink transmission is established, the base station generally determines an idle state of the unlicensed band by comparing the intensity of a signal received for a predetermined time with a predefined threshold value or a threshold value calculated by a function including at least one variable among a channel bandwidth, a signal bandwidth at which a signal to be transmitted is transmitted, the intensity of transmission power, the beam width of a transmission signal, etc.

For example, when the intensity of a signal received for 25 us is less than a predefined threshold value of −72 dBm, the base station may determine that the unlicensed band is idle and may perform downlink transmission. At this time, the maximum possible time of the downlink signal transmission may be limited according to a maximum channel occupancy time defined for each country and region in the unlicensed band. For example, in Japan, in a 5 GHz unlicensed band, a base station or a UE can transmit a signal by occupying the channel for a maximum of 4 ms after the channel access procedure is performed. When the intensity of a signal received for 25 us is greater than a predefined threshold of −72 dBm, the base station determines that the unlicensed band is not idle and does not perform the downlink transmission.

Figure 4:
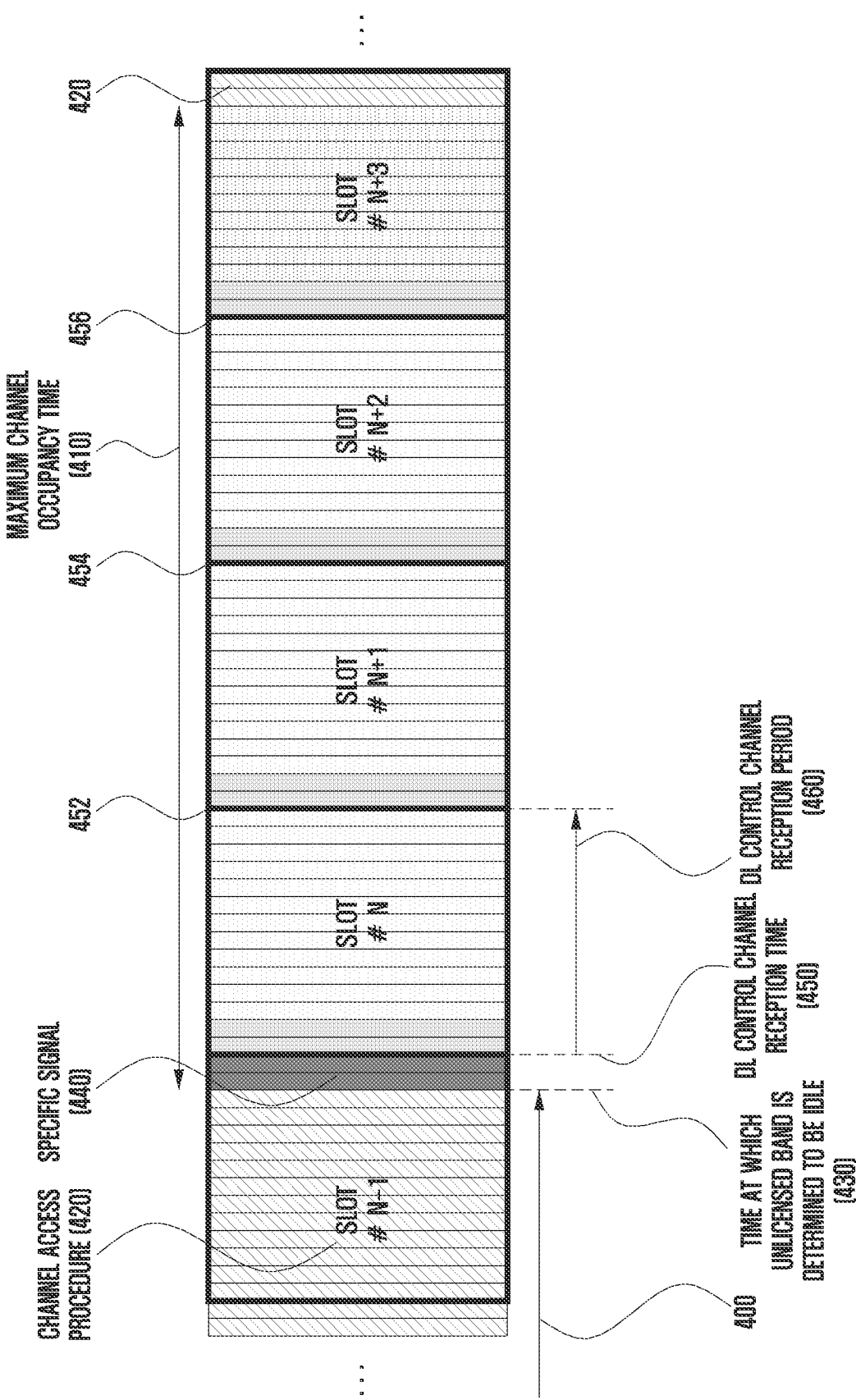
FIG. 4 illustrates a downlink control channel reception time or period of a base station and a UE.

FIG. 4 illustrates a downlink control channel reception time or period of a base station and a UE. The following detailed description will be made with reference to FIG. 4.

The UE receives a configuration for a time or period (e.g., every slot or every subframe 450, 452, 454, and 456 or period thereof 460), during which the UE must receive the downlink control channel, from the base station through a higher-layer signal. In this case, the time or period during which the UE receives the downlink control channel may be configured according to downlink control information (DCI or DCI formats) transmitted through the downlink control channel and according to the time and frequency location (a search space or a control resource set (CORESET)) in which the downlink control channel is transmitted. A part of the time or period during which the UE receives the downlink control channel may be defined in advance between the base station and the UE.

The UE, having received the configuration for a downlink control channel reception time or period as described above, receives a downlink control channel according to the configured time or period. When the base station transmits downlink control information (DCI) to the UE through the received downlink control channel, the UE may receive, in the time and frequency domain configured in the received downlink control information, the downlink control information (e.g., at least one downlink signal among a channel-state information reference signal (CSI-RS), a physical broadcast channel (PBCH), or a physical downlink shared channel (PDSCH)), or may transmit, to the base station, uplink control information (e.g. at least one uplink signal among a sounding reference signal (SRS), uplink control information (UCI), a physical random access channel (PRACH), a PUCCH, or a PUSCH). In other words, in accordance with a downlink control channel reception time or period configured for a UE, a base station may transmit downlink control information (for establishing downlink signal reception or uplink signal transmission) to the UE, and the UE may receive a downlink control channel from the base station according to the configured downlink control channel time or period to thereby receive the downlink control information.

Hereinafter, an example of an operation of a base station and a UE communicating with each other using an unlicensed band will be described. The base station determines that downlink signal transmission is necessary for the UE, and transmits downlink control information to the UE according to the downlink control channel reception time or period of the UE. In order to transmit the downlink control information, the base station performs, before a downlink control channel reception time 450 or period of the UE, a channel access procedure 420 for an unlicensed band which the base station desires to use for transmitting a downlink signal to the UE. In the disclosure, since the channel access procedure of the base station or the UE is not related to the problem to be solved in the disclosure, a detailed description of the channel access procedure is omitted in the disclosure.

When a base station determines that the unlicensed band is idle, the base station may transmit a downlink signal or may receive an uplink signal from at least one UE for the maximum channel occupancy time 410 through the unlicensed band. The maximum channel occupancy time (or the maximum channel occupancy interval) in which the base station and the UE can transmit signals through the unlicensed band may be defined differently for each country and region. For example, in Japan, a base station or a UE in a 5 GHz unlicensed band can transmit a signal while occupying the channel for a maximum time of 4 ms after performing a channel access procedure. A base station or UE that has occupied or used the unlicensed band during the maximum channel occupancy time must again perform the channel access procedure for the unlicensed band.

When a time 430, at which the base station determines that the unlicensed band is idle through the performance of a channel access procedure, precedes the time 450 at which the UE receives a downlink control channel, the base station may occupy the unlicensed band until the time 450, at which the UE receives the downlink control channel, by transmitting a specific signal 440 (e.g., a reservation signal) until the downlink control channel reception time of the UE. The specific signal may be a signal arbitrarily generated by the base station or a signal defined in advance between the base station and the UE. Also, the UE may not receive the specific signal.

When the base station transmits, as described above, a specific signal to occupy an unlicensed band, the transmission time of the specific signal is also included in the maximum channel occupancy time. When the UE does not receive the specific signal, the specific signal transmission is unnecessary signal transmission. Therefore, the base station preferably minimizes the transmission time of the specific signal. However, since the base station cannot know, in advance, the result of performing the channel access procedure, the specific signal transmission may be inevitable. In order to solve this problem, the base station configures the UE to very frequently receive downlink control information (for example, the base station may configure the UE to receive downlink control information every N symbols (N≥1), thereby minimizing the transmission time of the specific signal. For example, the base station configures the UE to receive downlink control information in each symbol and performs the channel access procedure, and then, immediately after the unlicensed band is determined to be idle, transmits a downlink signal (e.g. downlink control information including uplink/downlink resource allocation information) to the UE, and thus may not transmit the specific signal or may minimize the transmission time of the specific signal.

However, the UE configured to transmit or receive a signal in the unlicensed band very frequently receives downlink control information transmitted from a base station and must detect or determine every time, from the received downlink control information, that uplink/downlink resource allocation information or uplink/downlink scheduling information configured by the base station has been transmitted to the UE. As described above, when the UE frequently performs downlink control information reception and detection, the UE consumes excessive power to receive and decode the downlink control information and thus the performance of the UE may be lowered. Therefore, there is a need for a method of minimizing unnecessary downlink signal reception and detection of the UE while minimizing the transmission of the specific signal.

Hereinafter, embodiments of the disclosure will be described under the assumption that the period of time during which the UE should receive or monitor a downlink control channel is periodically configured. In other words, a description will be made under the assumption that the UE periodically receives or monitors the downlink control channel and that the value of the period is predefined, is configured through a higher-layer signal, or is indicated through a downlink control channel or a downlink data channel. However, methods proposed in the embodiments of the disclosure may also be applied to the case where the UE aperiodically receives or monitors the downlink control channel. For example, the method proposed in the disclosure may be applied to the case where the time at which the UE is to receive or monitor a downlink control channel may be configured or designated in a bit map form. For example, the time (symbol or slot) at which the UE is to receive or monitor the downlink control channel may be configured or designated by the base station through a bit map defined based on a predetermined time interval such as a time of 1 ms or 10 ms.

First Embodiment

The first embodiment describes a method in which a time or period required for a UE to receive a downlink control channel is (re)configured or changed through at least one type of downlink control information transmitted by the base station through a downlink control channel.

The UE may receive a configuration for at least one "time or period for receiving the downlink control channel" from the base station through a higher-layer signal. For example, the UE may be configured to receive the downlink control channel according to a first reception time or a first reception period (e.g. every N symbols, N≥1). Also, the UE may be configured to receive the downlink control channel according to a second reception time or a second reception period (e.g. every N slots, N≥1) in addition to the first reception time or the first reception period. Hereinafter, the first reception time and the first reception period are referred to as a first reception time/period, and the second reception time and the second reception period are described as a second reception time/period. In this case, the first reception time/period and the second reception time/period may be different. Also, it is possible to further configure a time or a period for the UE to receive the downlink control channel, in addition to the first reception time/period and the second reception time/period.

Meanwhile, at least one time or period (e.g. one of the first reception time/period or the second reception time/period) of the downlink control channel reception time or period configured for the UE may be defined in advance between the base station and the UE, or may be configured through system information (e.g. a master information block (MIB), remaining system information (RMSI), a system information block (SIB), or the like) transmitted by the station. For example, the first reception time/period may be defined in advance between the base station and the UE, and the first time or period may be defined differently according to a frequency band, a bandwidth part, or a subcarrier interval. In this case, a time and frequency resource domain (search space or CORESET) through which a downlink control channel, which the UE is to receive or monitor in the first reception time/period and the second reception time/period, can be transmitted may be configured differently. Further, the types of downlink control information (DCI) that the UE is to receive or monitor in the first reception time/period and the second reception time/period may be different.

Assuming that a time or period at which the UE receives a downlink control channel is configured through a higher-layer signal from the base station, that is, a first reception time/period is configured through a higher-layer signal, the following description will be made. The content of the disclosure may also be applied even when the first reception time/period is predefined between the base station and the UE or is configured through system information (e.g. a master information block (MIB), remaining system information (RMSI), a system information block (SIB)) or the like transmitted by the station. A first reception time/period, at which the UE is to receive a downlink control channel, is configured through a higher-layer signal from the base station, and then the UE receives the downlink control channel according to the first reception time/period. When the UE determines, through the downlink control channel reception, that the base station has transmitted downlink control information (DCI) to the UE, the UE may, according to the received downlink control information, receive a downlink signal or transmit an uplink signal.

Figure 5:
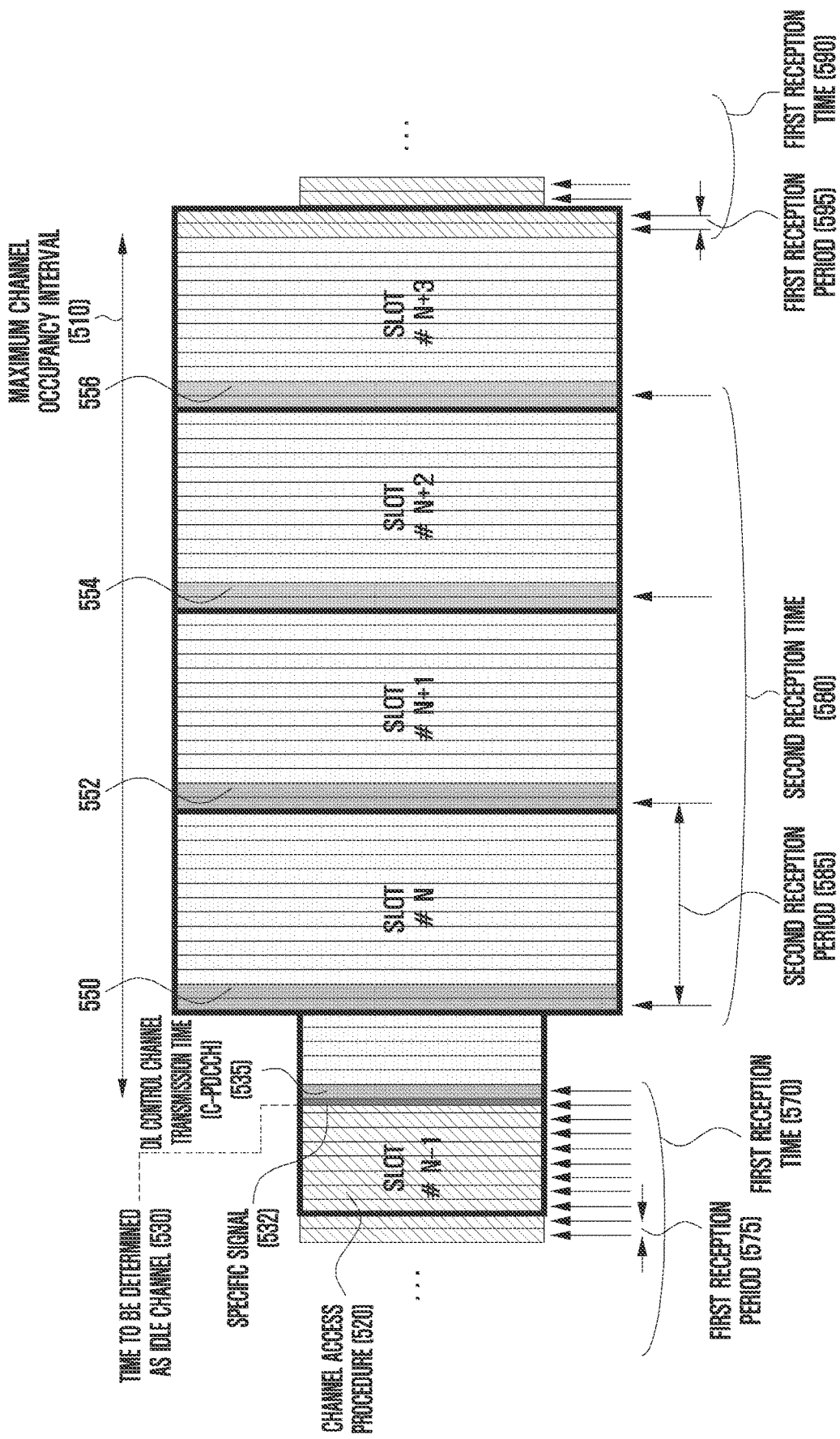
FIG. 5 illustrates an example of a downlink control channel reception time or period of a base station and a UE of the disclosure.

The following more detailed description will be made with reference to FIG. 5 as an example. FIG. 5 illustrates a downlink control channel reception time or period of a base station and a UE according to the disclosure.

The UE is configured to receive a downlink control channel in a first reception time 570 or a first reception period 575 with respect to the unlicensed band cell through a higher-layer signal from the base station. The UE receives the downlink control channel at the configured first reception time/period and determines whether the base station has transmitted downlink control information to the UE. The base station performs a channel access procedure 520 for an unlicensed band in order to transmit a downlink signal to the UE through the unlicensed band. When it is determined through the channel access procedure that the unlicensed band is an idle channel, the base station may transmit a downlink control channel or a downlink data channel to the UE after a time 530 at which the unlicensed band has been determined to be an idle channel.

When a base station wishes to transmit a downlink signal to a UE for which a first signal reception time 570 or period 575 has been configured, the base station may transmit a downlink control channel at an earliest time 535 of the first signal reception time 570 or period 575 of the UE among times after the time 530 at which the unlicensed band is determined to be an idle channel. At this time, the base station may transmit a specific signal (e.g. an occupancy signal) 532 between the time 530 at which the base station has determined that the unlicensed band is the idle channel and the time at which the base station transmits the downlink control channel or the downlink data channel. At this time, the UE may not receive the specific signal 532. The UE, for which the first signal reception time 570 or period 575 has been configured as described above, may receive downlink control information (DCI) or uplink/downlink scheduling information, which configures the UE to receive a downlink signal or transmit an uplink signal, through the downlink control channel transmitted by the base station at the time 535.

Since the base station and the UE cannot know the result of the channel access procedure for the unlicensed band of the base station, "the time 530 or symbol at which the base station determines that the unlicensed band is an idle channel", "the time or symbol at which the base station can transmit a downlink control channel or a downlink data channel", and "the first signal reception time or period configured for the UE to which downlink control information is to be transmitted" may all be different. In this case, in order to continue to occupy of the unlicensed band, the base station may transmit a specific signal or occupancy signal between "the time 530 or symbol at which the unlicensed band is determined to be an idle channel" and "the time or symbol at which a downlink control channel or a downlink data channel can be transmitted", or between "the time 530 or symbol at which the unlicensed band is determined to be an idle channel" and "the time or symbol at which a downlink control channel or a downlink data channel can be transmitted", or "the first signal reception time or period configured for the UE to which downlink control information is to be transmitted".

In order to minimize the transmission of the specific signal or occupancy signal as described above, the base station may configure the first signal reception time or period of the UE to be short (e.g. every symbol) so that the UE frequently receives a downlink control channel. The frequent reception of the downlink control channel, as described above, is necessary in order to minimize the transmission of the occupancy signal before the base station occupies the unlicensed band or during the channel access procedure. However, the UE does not need to frequently receive the downlink control channel as described above within the maximum channel occupancy interval after the base station occupies the unlicensed band.

Therefore, it is preferable that the UE receives the downlink control channel according to a downlink control channel reception time or period different from the first signal time or period within an interval in which the channel is occupied and used after at least the base station occupies the unlicensed band. In other words, there is a need for a method which makes it possible to (re)configure or change the configured downlink control channel reception time or period of the UE according to the channel occupation state of the base station or information corresponding thereto, thereby minimizing unnecessary downlink control channel reception and monitoring.

To this end, when the base station determines that the unlicensed band is idle after performing the channel access procedure and then occupies the channel, the base station may inform UEs of whether the unlicensed band is occupied or information corresponding thereto, so as to allow the UEs to change the downlink control channel reception time or period. Whether the unlicensed band is occupied or the corresponding information will be described in detail below.

In the case of a UE that does not receive downlink control information (DCI) or uplink/downlink scheduling information from the base station (in other words, referred to as a UE for which the base station does not configure downlink signal reception or uplink signal transmission during the channel occupancy interval), the UE frequently receives a downlink control channel according to the first signal reception time 570 or period 575, and thus may unnecessarily consume power for the downlink control channel reception. Therefore, the base station may perform the channel access procedure and may transmit a downlink signal including at least the downlink control channel in the unlicensed band when the unlicensed band is determined to be an idle channel through the channel access procedure.

The downlink signal may be transmitted through a downlink control channel transmitted in common to a cell-common or specific UE group (a cell-common PDCCH, a UE-group-common PDCCH (GC-PDCCH), or a downlink control channel which has been scrambled with a predefined or preconfigured RNTI and is thus distinguishable, hereinafter, referred to as a common PDCCH or a C-PDCCH). Accordingly, the base station may transmit the result of the channel access procedure performed by the base station, information corresponding thereto, or information on a slot format to both a UE having received downlink or uplink scheduling from the base station and a UE which has not received downlink or uplink scheduling from the base station. At this time, the base station may transmit, to the UEs, the result of the channel access procedure performed by the base station, information corresponding thereto, or information on a slot format through UE-specific downlink control information (UE-specific DCI) (or a downlink control channel scrambled with a UE-specific identifier (C-RNTI)).

Here, the result of the channel access procedure or information thereto or information on a slot format may include at least one among the length of a channel occupancy interval, information on a downlink and/or uplink transmission interval (e.g. the downlink and/or uplink transmission start time (or offset) and a transmission interval length), or slot format indicator (SFI) information for one or more slots. Even when the information does not include information on a downlink and/or uplink transmission interval or slot format indicator (SFI) information, the UE, having determined that the C-PDCCH has been correctly received, may determine according to the result of the C-PDCCH reception that the base station has occupied the unlicensed band.

When the UE receives the C-PDCCH including at least one of the information on a downlink and/or uplink transmission interval or the slot format indicator (SFI) information as described above, the UE may determine a channel occupancy interval of the base station through the information and may receive a downlink control channel according to a second signal reception time 580 or period 585 in the determined channel occupancy interval. In other words, 1) the UE may receive a downlink control channel according to the configured first signal reception time 570 or period 575, 2) when a received C-PDCCH includes at least one of the information on a downlink and/or uplink transmission interval or the slot format indicator (SFI) information, the UE may change a downlink control channel reception time or period to the second signal reception time 580 or a period 585 in the channel occupancy interval determined through the C-PDCCH to receive a downlink control channel, and 3) after the determined channel occupancy interval, the UE may again receive a downlink control channel according to a first signal reception time 590 or period 595.

In this case, the second signal reception time 580 or period 585 may be predefined as a value different from the first signal reception time 570 or period 575 between the base station and the UE, may be configured for the UE by the base station through a higher-layer signal, or may be indicated to the UE, through the C-PDCCH, by a second signal reception time 580 or period 585 value or an offset value from the first signal reception time 570 or period 575. At this time, multiple second signal reception times 580 or periods 585 may be predefined between the base station and the UE, or multiple second signal reception times 580 or periods 585 may be configured for the UE through a higher-layer signal from the base station.

Alternatively, the base station may select one of the multiple second signal reception times 580 or periods 585 predefined or configured for the UE through a higher-layer signal, and may indicate the selected second signal reception time 580 or period 585 to the UE through a C-PDCCH. For example, the base station may configure four different second signal reception times 580 or periods 585 to the UE through a higher-layer signal, may select one of the four values, and may transmit the same via a C-PDCCH, thereby indicating the second signal reception time 580 or period 585 of the UE. At this time, the first signal reception time 570 or period 575 may be included in the multiple second signal reception times 580 or periods 585. The second signal reception time 580 or period 585 for a C-PDCCH and the second signal reception time 580 or period 585 for UE-specific downlink control information may be configured to be identical to or different from each other.

For example, a base station may include, in a C-PDCCH, information on a time or slot that the base station desires to use for downlink signal transmission or uplink signal transmission of a UE with respect to an unlicensed band determined to be idle after a channel access procedure, and may transmit the same to the UE. The information on the time or slot may be within a maximum channel occupancy interval. For example, in the case of Japan having a maximum channel occupancy interval of 4 ms, a base station may include, in a C-PDCCH, information on an uplink/downlink transmission interval that the base station wishes to use within the 4 ms interval with respect to an unlicensed band determined to be idle after a channel access procedure (e.g. downlink transmission is performed for the first 2 ms and uplink transmission is configured for 2 ms thereafter), and may transmit the same to a UE.

In order to notify the UE of the downlink transmission interval and the uplink transmission interval, the base station may include at least one value among a downlink transmission interval offset, a downlink transmission interval length, an uplink transmission interval offset, and an uplink transmission interval length in a C-PDCCH, and may transmit the same to the UE. At this time, the downlink transmission interval offset is a value indicating a start time (a symbol or slot) at which the downlink transmission interval begins with reference to "the index of a symbol or slot in which the C-PDCCH has been received" or "the index of a slot immediately following the slot in which the C-PDCCH has been received", and may include a symbol or a slot. The uplink transmission interval offset is a value indicating a start time (a symbol or slot) at which the uplink transmission interval begins with reference to "a symbol or slot in which the C-PDCCH has been received", or indicating a start time (a symbol or slot) at which the uplink transmission interval begins with reference to "the end time (symbol or slot) of the downlink transmission interval". When the uplink transmission interval offset indicates the start time of the uplink transmission interval with reference to the end time of the downlink transmission interval, uplink transmission interval offset information may not be included in the C-PDCCH.

As another example, the base station may include, in a C-PDCCH, a slot format indicator (SFI) for some slots or all transmission slots in the maximum channel occupancy interval to the UE, and may transmit the same to the UE. The SFI may be within a maximum channel occupancy interval of the unlicensed band. For example, when one slot includes K symbols, the SFI is information indicating the number of symbols used for downlink or uplink signal transmission among the K symbols. In other words, through the slot format indicator, the UE may determine that all of the K symbols are used for downlink transmission, all of the K symbols are used for uplink transmission, or some K1 of the K symbols are used for downlink transmission, and all of the remaining symbols or some K2 of the remaining symbols are used for uplink transmission. In this case, some of the K symbols may not be used for both downlink and uplink transmission, or may be used as a gap necessary for switching from downlink to uplink (i.e., K≥K1+K2).

Further, the SFI information includes information indicating that all of the K symbols in the slot are unknown symbols, which are not used neither for downlink signal transmission nor for uplink signal transmission, or flexible symbols that can be changed to downlink or uplink according to scheduling information. In the unknown or flexible symbols or slots, the UE may not perform downlink signal reception or uplink signal transmission, or may perform downlink signal reception or uplink signal transmission according to information scheduled through UE-specific DCI in addition to the C-PDCCH. The UE may receive the downlink control channel using the first reception time/period in the unknown slot. At this time, the UE may not perform a downlink control channel reception operation in the symbol or slot designated to be an uplink transmission symbol through the slot format indicator.

In this case, in order to transmit the slot format indicator information of some or all of the transmission slots in the maximum channel occupancy interval, slot format indicator information of a slot corresponding to the number of slots included in the maximum channel occupancy interval or corresponding to a number obtained by subtracting one from the number of slots may be included in a C-PDCCH and transmitted to the UE. For example, when the maximum channel occupancy interval of X ms includes a total of Y slots, slot format indicator information of each of the Y slots may be sequentially included in the C-PDCCH.

At this time, at least one of the Y pieces of slot format information may not be actually used or may be indicated as being in the unknown state. For example, as shown in FIG. 5, when up to five slots are included in the maximum channel occupancy interval 510, the C-PDCCH 535, which the base station has transmitted after determining that the unlicensed band is idle, may sequentially include slot format indicator information of five slots (N−1, N, N+1, N+2, N+3), including slot format indicator information of slot N−1, in which the C-PDCCH 535 is transmitted.

When the C-PDCCH is transmitted at any time point in slot N−1 (when the C-PDCCH is transmitted at a time point after the first symbol of slot N−1 or is transmitted after an initial time and frequency resource domain (or CORESET)

in which the C-PDCCH can be transmitted within slot N−1), the base station may transmit the C-PDCCH 535 including only format information of the remaining slots excluding format indicator information of slot N−1 in which the C-PDCCH is transmitted (e.g. slot format information of slots N, N+1, N+2, and N+3). At this time, as described above, the UE having received the C-PDCCH 535 in a predetermined symbol of slot N−1 may determine that the slot format indicator information included in the C-PDCCH includes slot format indicator information of the slot immediately following the slot in which the C-PDCCH was received. Here, the predetermined symbol is the symbol after the first symbol in slot N−1. In another example, when considering the minimum processing time (X) necessary for decoding the C-PDCCH received in slot N−1 by the UE and acquiring slot format indicator information from the decoded signal, the predetermined symbol is the symbol before an X symbol with reference to a slot N start symbol in consideration of the downlink control signal processing minimum time of the UE.

When the base station transmits the C-PDCCH 535 including the format information of the remaining slots excluding the format indicator information for slot N−1, in which the C-PDCCH is transmitted, the UE may assume that slot N−1, in which the C-PDCCH 535 is received, is entirely used as a downlink transmission symbol. Alternatively, the UE may determine that slot N−1, in which the C-PDCCH 535 is received, is an unknown or flexible symbol, or may perform a signal transmission/reception operation in the slot according to downlink or uplink scheduling information. At this time, the scheduling information may include at least one of scheduling information received before reception of the C-PDCCH 535 or scheduling information received in slot N−1.

In order to notify the UE of the position of the slot to which the slot format indicator information is applied or begins to be applied, the C-PDCCH may include an offset for the slot format indicator information included in the C-PDCCH (i.e. time information to which the slot format indicator information included in the C-PDCCH is applied). The slot format indicator information offset may be applied with reference to a C-PDCCH reception slot. In FIG. 5, for example, slot N−1 may be used as a reference. At this time, the slot format indicator information offset may be applied with reference to the slot immediately following the C-PDCCH reception slot. In the case of FIG. 5, for example, slot N can be applied as a reference. Alternatively, when the UE receives a C-PDCCH in a symbol after the first symbol of a particular slot, the slot format indicator information offset may be applied with reference to the slot immediately following the slot in which the C-PDCCH is received. As another example, the minimum processing time (X) required to decode the C-PDCCH received by the UE and obtain the slot format indicator information from the decoded signal may be considered. When a symbol in which the UE receives the C-PDCCH is a symbol before a 14-X symbol of the particular slot, the slot format indicator information offset is applied based on the slot immediately following the C-PDCCH reception slot. When a symbol in which the UE receives the C-PDCCH is a symbol after the 14-X symbol, the slot format indicator information offset may be applied with reference to a symbol after two slots from the symbol in which the C-PDCCH is received.

Consideration will be given to the case where a C-PDCCH, which the base station in FIG. 5 transmits after the unlicensed band is determined to be idle through the channel access procedure, includes at least one of the downlink and/or uplink transmission interval information or the slot format indicator (SFI) information as described above. As described above, upon receiving the C-PDCCH including at least one of the downlink and/or uplink transmission interval information or the slot format indicator (SFI) information, the UE may receive a downlink control channel according to the configured second signal reception time 580 or period 585. In other words, 1) the UE may continue to receive a downlink control channel according to the configured first signal reception time 570 or period 575, and 2) when the received C-PDCCH includes at least one of the downlink and/or uplink transmission interval information or the slot format indicator (SFI) information, the UE may change a downlink control channel reception time or period to the second signal reception time 580 or period 585 so as to receive a downlink control channel.

A description will be made with reference to FIG. 5 below. The UE receiving a downlink control channel according to the first signal reception time 570 or period 575 receives the C-PDCCH 535. When the received C-PDCCH 535 includes information on a downlink transmission interval (e.g. when information included in the C-PDCCH indicates at least one among a downlink transmission slot start slot (or offset), the number of downlink transmission slots, and the number of downlink symbols of the downlink transmission slots (for example, in FIG. 5, when information included in the C-PDCCH indicates that slot N to slot N+3 are downlink transmission slots, slot N+3 is a downlink transmission slot including 12 downlink transmission symbols)), the UE receives a downlink control channel according to the second signal reception time 580 or period 585 during the downlink transmission interval indicated by the C-PDCCH 535. After the downlink transmission interval indicated by the C-PDCCH 535, the UE may receive a downlink control channel according to the first signal reception time 570 or period 575.

At this time, the downlink transmission slot start slot (or offset) refers to a slot through which the C-PDCCH is transmitted, or a slot following the slot through which the C-PDCCH is transmitted. When the downlink transmission slot start slot (or offset) refers to a slot through which the C-PDCCH is transmitted, or a slot following the slot through which the C-PDCCH is transmitted, the C-PDCCH may not include downlink transmission start slot (or offset) information. In this case, when the C-PDCCH is transmitted in a symbol subsequent to the first symbol among symbols in a transmission slot, the downlink transmission start slot (or offset) refers to a slot following a slot through which the C-PDCCH is transmitted. When the C-PDCCH is transmitted in the first symbol among the symbols in the transmission slot, the downlink transmission start slot (or offset) refers to a slot through which the C-PDCCH is transmitted.

Also, when the C-PDCCH is transmitted in a symbol after the first symbol among the symbols in the transmission slot, information on the slot through which the C-PDCCH is transmitted may not be included in the downlink transmission interval information indicated in the C-PDCCH. When the information on the slot through which the C-PDCCH is transmitted is not included in the downlink transmission interval information indicated by the C-PDCCH, the UE may determine that all symbols of the slot through which the C-PDCCH is transmitted are used for downlink signal transmission. Alternatively, when the information of the slot through which the C-PDCCH is transmitted is not included in the downlink transmission interval information indicated by the C-PDCCH, the UE may determine that all symbols of the slot through which the C-PDCCH is transmitted are unknown or flexible symbols, and may perform, according to downlink or uplink scheduling information, signal transmission/reception in a slot in which the C-PDCCH is transmitted.

When the UE receives a C-PDCCH in a time or slot after the time or slot N−1 at which the C-PDCCH 535 is received, the UE may determine a downlink control channel reception time or period according to information included in a most recently received C-PDCCH in the channel occupancy interval (e.g. information on the downlink and/or uplink transmission interval, the slot format indicator (SFI) information, and the like).

The case in which the C-PDCCH includes slot format indicator information of one or more slots is will be described as an example. When the channel occupancy interval 510 includes N slots, for example, when slots N−1, N, N+1, N+2, and N+3 are allocated to the channel occupancy interval 510 in FIG. 5, slot format indicator information of N slots may be sequentially included in the C-PDCCH. For example, from the most significant bit (MSB) of the field for transmitting the slot format indicator information in the C-PDCCH, the slot format indicator information of N slots including a start slot in which the base station starts occupying a channel can be sequentially mapped. At this time, assuming that the slot format indicator information includes L bits, the size of a field for transmitting the slot format indicator information is L*N bits. In FIG. 5, the base station may transmit slot indicator information for each slot from slot N−1 to slot N+3 through the C-PDCCH 532.

When the base station transmits a C-PDCCH 550 in slot N, since the slot format indicator information may include only slot indicator information for slots from slot N to slot N+3, the size of a field for transmitting the slot format indicator information may be reduced. However, when the size of the field for transmitting the slot format indicator information changes according to the C-PDCCH transmission slot, the size of the C-PDCCH changes, and thus the C-PDCCH reception and detection complexity of the UE increases. Therefore, it is preferable that the size of the field for transmitting the slot format indicator information be kept constant regardless of the C-PDCCH transmission slot.

Therefore, when the base station transmits the C-PDCCH 550 in slot N, slot format indicator information of slots from slot N to slot N+3 is sequentially mapped to the most significant bit of the field for transmitting the slot format indicator information, and slot format indicator information, predefined for a slot (e.g. slot N−1) previously used in the channel occupancy interval or having no valid slot format indicator information, may be mapped to a least significant bit (LSB) of the field. For example, a slot format indicator of one slot (e.g. slot N−1) is represented as slot format indicator information indicating "unknown" and mapped to a least significant bit of a field for transmitting the slot format indicator information of the C-PDCCH 550.

Similarly, when the base station transmits a C-PDCCH 552 in slot N+1, slot format indicator information of slots from slot N+1 to slot N+3 is sequentially mapped to the most significant bit of the field for transmitting the slot format indicator information, and slot format indicator information, predefined for a slot (e.g. slots N−1 and N) previously used in the channel occupancy interval or having no valid slot format indicator information, may be mapped to a least significant bit of the field. For example, slot format indicator information indicating that the two slots are unknown may be included in the least significant bit of the field for transmitting the slot format indicator information.

In other words, the slot format indicator information transmitted through a C-PDCCH includes slot format indicator information of a slot in which the C-PDCCH is transmitted and a valid slot after the slot in which the C-PDCCH is transmitted in a channel occupancy interval of the base station, and may include a predefined slot format indicator for an already indicated slot or an already occupied or used slot in the channel occupancy interval. Accordingly, the UE can use only the slot format indicator information of the slot in which the C-PDCCH is transmitted and a valid slot thereafter.

Alternatively, the base station may transmit, through a C-PDCCH, slot indicator information for each slot from slot N−1 to slot N+3, wherein the slot indicator information is sequentially included according to the slot in a slot indicator information field in the C-PDCCH from the MSB of the field. At this time, the base station may indicate valid slot indicator information among the slot format indicators to the UE through an additional indicator of the slot indicator information of the slot format indicator. For example, the base station may sequentially include, in the C-PDCCH 535, slot format indicator information of each slot from slot N−1 to slot N+3 and transmit the same through the C-PDCCH 535 in slot N−1. Through a field indicating a valid slot format indicator among the slot format indicators, the base station may indicate that the slot format indicators are valid from the slot N−1. When the C-PDCCH 550 is transmitted in slot N, the base station may sequentially include, in the C-PDCCH 550, slot format indicator information of each slot from slot N−1 to slot N+3 and transmit the same. Further, the base station may indicate that the slot format indicators are valid from slot N through a field indicating a valid slot format indicator among the slot format indicators.

When the C-PDCCH 552 is transmitted in slot N+1, the base station may sequentially include, in the C-PDCCH 552, slot format indicator information of each slot from slot N−1 to slot N+3 and transmit the same. Further, the base station may indicate that the slot format indicators are valid from slot N+1 through a field indicating a valid slot format indicator among the slot format indicators. Slots N−1 and N before the valid slot N+1 indicated by the valid slot format indicator may be indicated as predefined slot format indicator information (e.g. slot format indicator information indicating "unknown" or slot format indicator information in which all symbols in a slot are uplink transmission symbols, or the like). At this time, the UE may ignore slot format indicator information of slots N−1 and N before the valid slot N+1 indicated by the valid slot format indicator. In addition, the field indicating the effective slot format indicator should be able to indicate the number of slots through which the valid slot format indicator is transmitted in the C-PDCCH. For example, when the C-PDCCH 552 is transmitted, a field indicating a valid slot format indicator may indicate the value 3.

Another example will be described with reference to FIG. 5 below. Consideration will be given to the case where a UE receiving a downlink control channel according to the first signal reception time 570 or period 575 receives the C-PDCCH 535 and the received C-PDCCH 535 includes at least one of downlink transmission interval information or uplink transmission interval information (e.g. the case including at least one slot format indicator (SFI) information for at least one slot or a start slot (or offset) to which the slot format indicator is applied). The UE may receive a downlink control channel according to the second signal reception time 580 or period 585 in slots having slot formats indicated through slot format indicator information indicated in the C-PDCCH 535. Further, the UE may receive a downlink control channel according to the first signal reception time 570 or period 575 in a slot having a slot format which is not indicated through slot format indicator information indicated in the C-PDCCH 535, some slots of slots having slot formats which have been indicated in the C-PDCCH 535 (e.g. the last slot among the slots having the indicated slot formats or a slot having an indicated specific slot format), or a slot after the slot having the indicated slot format.

Here, the slot having the indicated specific slot format includes a predefined slot format, for example, a slot format indicating that all symbols of a slot are in a flexible state or an unknown state in which none of the symbols of the slot are used for downlink signal transmission or for uplink signal transmission. Meanwhile, a start slot (or offset) to which a slot format indicator is applied is a slot through which the C-PDCCH is transmitted or a slot following the slot through which the C-PDCCH is transmitted. When the start slot refers to a slot through which the C-PDCCH is transmitted or a slot following the slot through which the C-PDCCH is transmitted, the C-PDCCH may not include information on the start slot (or offset) to which the slot format indicator is applied. In this case, when the C-PDCCH is transmitted in a symbol after the first symbol among symbols in a transmission slot, the start slot (or offset), to which the slot format indicator is applied, may be determined to refer to a slot following a slot in which the C-PDCCH is transmitted. Further, it is determined that when the C-PDCCH is transmitted in the first symbol among the symbols in the transmission slot, the start slot (or offset), to which the slot format indicator is applied, may be determined to refer to a slot through which the C-PDCCH is transmitted.

Also, when the C-PDCCH is transmitted in a symbol after the first symbol among symbols in a transmission slot, the slot format indicator information indicated in the C-PDCCH may not include information on a slot through which the C-PDCCH is transmitted. When the slot format indicator information indicated in the C-PDCCH does not include the information on the slot through which the C-PDCCH is transmitted, the UE may determine that all symbols of the slot in which the C-PDCCH is transmitted are used for downlink signal transmission or are unknown. Further, when it is indicated that a slot corresponding to a slot format indicator indicated in the C-PDCCH does not include a downlink transmission interval or symbol, the UE may not receive a downlink control channel in the slot, or may receive a downlink control channel according to the first signal reception time 570 or period 575.

When the UE again receives a C-PDCCH at a time or slot after the time or slot N−1 at which the C-PDCCH 535 has been transmitted, the UE may determine a downlink control channel reception time or period according to information included in the most recently received C-PDCCH. At this time, the types of information on downlink transmission intervals included in C-PDCCHs transmitted at different times or symbols may be different from each other.

In this case, the second signal reception time 580 or period 585 may be predefined as a value different from the first signal reception time 570 or period 575 between the base station and the UE, may be configured in the UE through a higher-layer signal from the base station, or may be indicated by a second signal reception time 580 or period 585 value or an offset value from the first signal reception time 570 or period 575 to the UE through the C-PDCCH. At this time, multiple second signal reception times 580 or periods 585 may be predefined between the base station and the UE, or may be configured in the UE through a higher-layer signal from the base station. The base station may select one of the multiple second signal reception times 580 or periods 585 predefined or configured in the UE through the higher-layer signal, and may indicate the selected second signal reception time 580 or cycle 585 to the UE through a C-PDCCH. For example, the base station may configure four different second signal reception times 580 or periods 585 to the UE through a higher-layer signal, and may select one of the four values to indicate the selected one value via a C-PDCCH. At this time, the multiple second signal reception time 580 or period 585 may include the first signal reception time 570 or period 575.

Meanwhile, embodiments of the disclosure includes: the base station operation for configuring the first signal reception time/period and the second signal reception time/period and indicating the configured time or period and the UE operation for applying the same, described in the above embodiment; and the transmission method for an uplink or downlink transmission interval length or at least one piece of slot format indicator information transmitted in the C-PDCCH or second C-PDCCH and the UE operation therefor. The contents described in embodiments of the disclosure are not limited to a specific embodiment, and may be applied to all of the embodiments of the disclosure. Therefore, unnecessary repetition of a description will be omitted by omitting a description of parts of the first embodiment that can be applied and determined using the contents described in the second, third, and fourth embodiments.

Second Embodiment

The second embodiment relates to a method in which a UE receives a downlink control channel commonly transmitted to a cell-common or specific UE group (a cell-common PDCCH, a UE-group-common PDCCH (GC-PDCCH), or a downlink control channel which has been scrambled with a predefined or preconfigured RNTI and is thus distinguishable, hereinafter, referred to as a common PDCCH or a C-PDCCH) according to a downlink control channel reception time or period (hereinafter, referred to as a first reception time/period) predefined or configured through a higher-layer signal from a base station, and the UE, which has determined that a C-PDCCH has been correctly received, receives UE-specific downlink control information (a UE-specific DPI) (or a downlink control channel scrambled with a UE-specific indicator (C-RNTI)) according to a downlink control channel reception time or period (hereinafter, referred to as a second reception time/period) predefined or configured through a higher-layer signal from a base station.

At this time, when a value or information related to the second reception time/period is included in the C-PDCCH, the second reception time/period may follow the value included in the C-PDCCH. Further, a starting point or offset of the second reception time/period may be applied with reference to "a symbol or a slot in which the C-PDCCH has been received" or "a symbol or slot after a T symbol or T slot in the symbol or slot in which the C-PDCCH has been received". In this case, T may be predefined as a value including 0, may be configured through a higher-layer signal from the base station, or may be included in the C-PDCCH.

Also, the second reception time/period is valid at least within a channel occupancy interval of the base station, and information on the effective channel occupancy interval may be directly transmitted to the UE through the C-PDCCH, or may be determined through uplink or downlink transmission interval information include in the C-PDCCH. For example, the UE may determine the channel occupancy interval information of the base station through an uplink or downlink transmission interval length or at least one slot format indicator transmitted in the C-PDCCH. Thereafter, the UE may receive UE-specific downlink control information according to the second reception time/period within the determined channel occupancy interval, and may receive at least C-PDCCH according to the first reception time/period outside the determined channel occupancy interval.

In this case, the UE receiving the C-PDCCH according to the first reception time/period may not receive the UE-specific downlink control information when the C-PDCCH is not received from the base station or outside the determined channel occupancy interval. That is, the UE may receive the UE-specific downlink control information within the channel occupancy interval determined from a symbol or a slot following the symbol or the slot in which the C-PDCCH transmitted by the base station was correctly received, thereby minimizing the consumption of power by the UE in receiving and monitoring the downlink control information. In this instance, the UE may receive UE-specific downlink control information, starting from the symbol or slot in which the C-PDCCH transmitted by the base station was correctly received.

Meanwhile, embodiments of the disclosure includes: the base station operation for configuring the first signal reception time/period and the second signal reception time/period and indicating the configured time or period, and the UE operation for applying the same, described in the above embodiments; and a transmission method for an uplink or downlink transmission interval length or at least one piece of slot format indicator information transmitted in the C-PDCCH or second C-PDCCH, and a UE operation therefor. The content described in connection with the embodiments of the disclosure is not limited to a specific embodiment, and may be applied to all of the embodiments of the disclosure. Therefore, unnecessary repetition of a description will be omitted by omitting a description of parts of the second embodiment that can be applied and determined using the content described in the first, third, and fourth embodiments.

Third Embodiment

The third embodiment relates to a method in which a UE activates or deactivates a second downlink control channel reception time or period of the UE according to the reception of specific downlink control information or the reception of specific MAC CE information so as to (re)configure or change a downlink control channel time or period. Here, the specific downlink control information may be transmitted through a downlink control channel commonly transmitted to a cell common or specific UE group (a cell-common PDCCH, a UE-group-common PDCCH (GC-PDCCH), or a downlink control channel which has been scrambled with a predefined or preconfigured RNTI and is thus distinguishable, hereinafter, referred to as a common PDCCH or a second C-PDCCH), or may be transmitted through UE-specific downlink control information (a UE-specific DPI) (or a downlink control channel scrambled with a UE-specific indicator (C-RNTI)). The C-PDCCH (or the second C-PDCCH) described in the present embodiment may be a C-PDCCH described in the first embodiment or the second embodiment, and may be a C-PDCCH transmitted after being scrambled with an identifier (RNTI) different from UE-specific downlink control information, for example, an identifier (RNTI) configured through a higher-layer signal from the base station or predefined in order to activate or deactivate a downlink control channel reception time or period of the UE.

Figure 6:
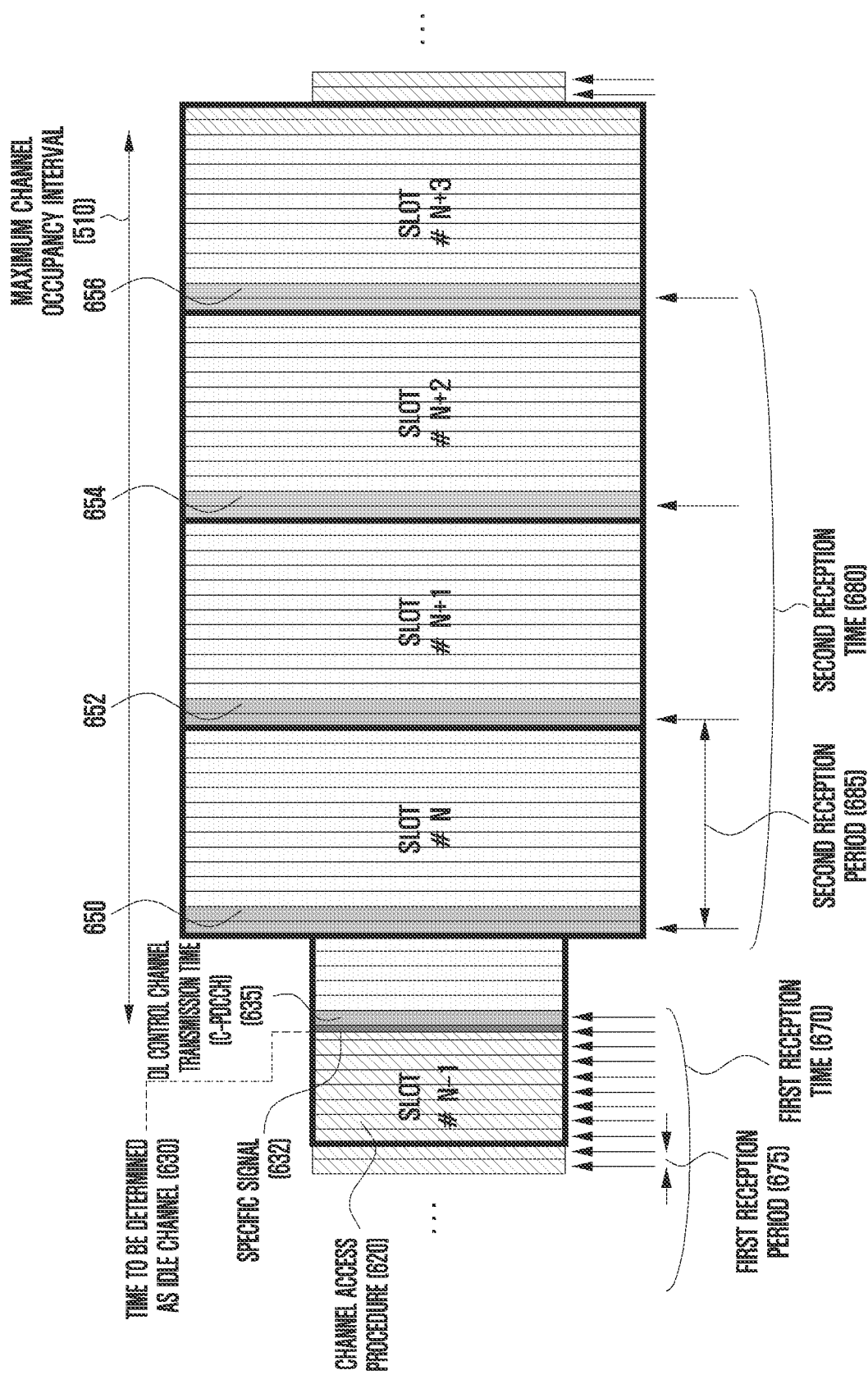
FIG. 6 illustrates another example of a downlink control channel reception time or period of a base station and a UE of the disclosure.

A more detailed description will be made with reference to FIG. 6 below. FIG. 6 illustrates another example of a downlink control channel reception time or period of a base station and a UE according to the disclosure.

At least one downlink control channel reception time or period of the UE may be configured by the base station through a higher-layer signal. For example, the UE may be configured to receive a downlink control channel according to a first reception time 670 or a first reception period 675 (e.g. every N symbols, N≥1, hereinafter, referred to as a first reception time/period). Further, the UE may be configured to receive a downlink control channel according to a second reception time 680 or a second reception period 685 (e.g. every N symbols, N≥1, hereinafter, referred to as a second reception time/period) in addition to the first reception time/period.

The UEs receive the downlink control channel according to the configured first signal reception time/period. When the UE receives a second C-PDCCH transmitted by the base station in slot N and the received second C-PDCCH includes information indicating the activation of the second reception time/period (e.g. when the UE determines that the activation of the second reception time/period is indicated through a value of a bit string indicating the activation of the second reception time/period to the second C-PDCCH, or when specific bits among bit strings included in the second C-PDCCH are indicated by previously defined or promised bits), the UE may determine that the received second C-PDCCH indicates the activation of the second reception time/period, and may receive a downlink control channel according to the second reception time 580 or period 585.

In this case, the UE may receive the downlink control channel according to the second reception time 580 or period 585 until the second C-PDCCH indicates deactivation or release of the second reception time/period. When the second C-PDCCH indicates deactivation or release of the second reception time/period, the UE may immediately receive the downlink control channel according to the first reception time/period. At this time, the first reception time/period may be applied from a T symbol or T slot after reception of the second C-PDCCH indicating the deactivation or release of the second reception time/period. In this case, T may be predefined as a value including 0, may be configured through a higher-layer signal from a base station, or may be included in the second C-PDCCH.

At this time, the second reception time/period may be deactivated or canceled through a deactivation timer, in addition to a method in which the second C-PDCCH indicates the deactivation or release of the second reception time/period. For example, the UE determines that the second C-PDCCH activates the deactivation timer from the time point at which the second reception time/period is activated and that the second reception time/period has been deactivated or released after a configured or defined timer time, and receive a downlink control channel according to the first reception time/period.

In this case, the second signal reception time 680 or period 685 may be predefined as a value different from the first signal reception time 670 or period 675 between the base station and the UE, may be configured for the UE by the base station, may be indicated to the UE by a second signal reception time 680 or period 685 value or an offset value from the first signal reception time 670 or period 675 through the C-PDCCH, or may be indicated to the UE by a second signal reception time 680 or period 685 value or an offset value from the first signal reception time 670 or period 675 through the second C-PDCCH.

At this time, multiple second signal reception times 680 or periods 685 may be predefined between the base station and the UE, or the multiple second signal reception times 680 or periods 685 may be configured for the UE through a higher-layer signal from the base station. The base station may select one of the multiple second signal reception times 680 or periods 685 predefined or configured for the UE through the higher-layer signal, and may indicate the selected one to the UE through a C-PDCCH or a second C-PDCCH. For example, the base station may configure four different second signal reception times 680 or periods 685 to the UE via a higher-layer signal, may select one of the four values, and may indicate the second signal reception time 680 or period 685 of the UE through the C-PDCCH or the second C-PDCCH. At this time, the first signal reception time 670 or period 675 may be included in the multiple second signal reception times 680 or periods 685.

Meanwhile, embodiments of the disclosure includes: the base station operation for configuring the first signal reception time/period and the second signal reception time/period and indicating the configured time or period, and the UE operation for applying the same, described in the above embodiments; and the transmission method for an uplink or downlink transmission interval length or at least one piece of slot format indicator information transmitted in the C-PDCCH or second C-PDCCH and the UE operation therefor. The content described in connection with embodiments of the disclosure is not limited to a specific embodiment, and may be applied to all of the embodiments of the disclosure. Therefore, unnecessary repetition of a description will be omitted by omitting a description of parts of the third embodiment that can be applied and determined using the content described in the first, second, and fourth embodiments.

Fourth Embodiment

The fourth embodiment relates to a method in which one or more bandwidth parts are configured for a UE and when a downlink control channel reception time or period are configured in each bandwidth part, the UE determines the downlink control channel reception time or period to be received by the UE.

Figure 7:
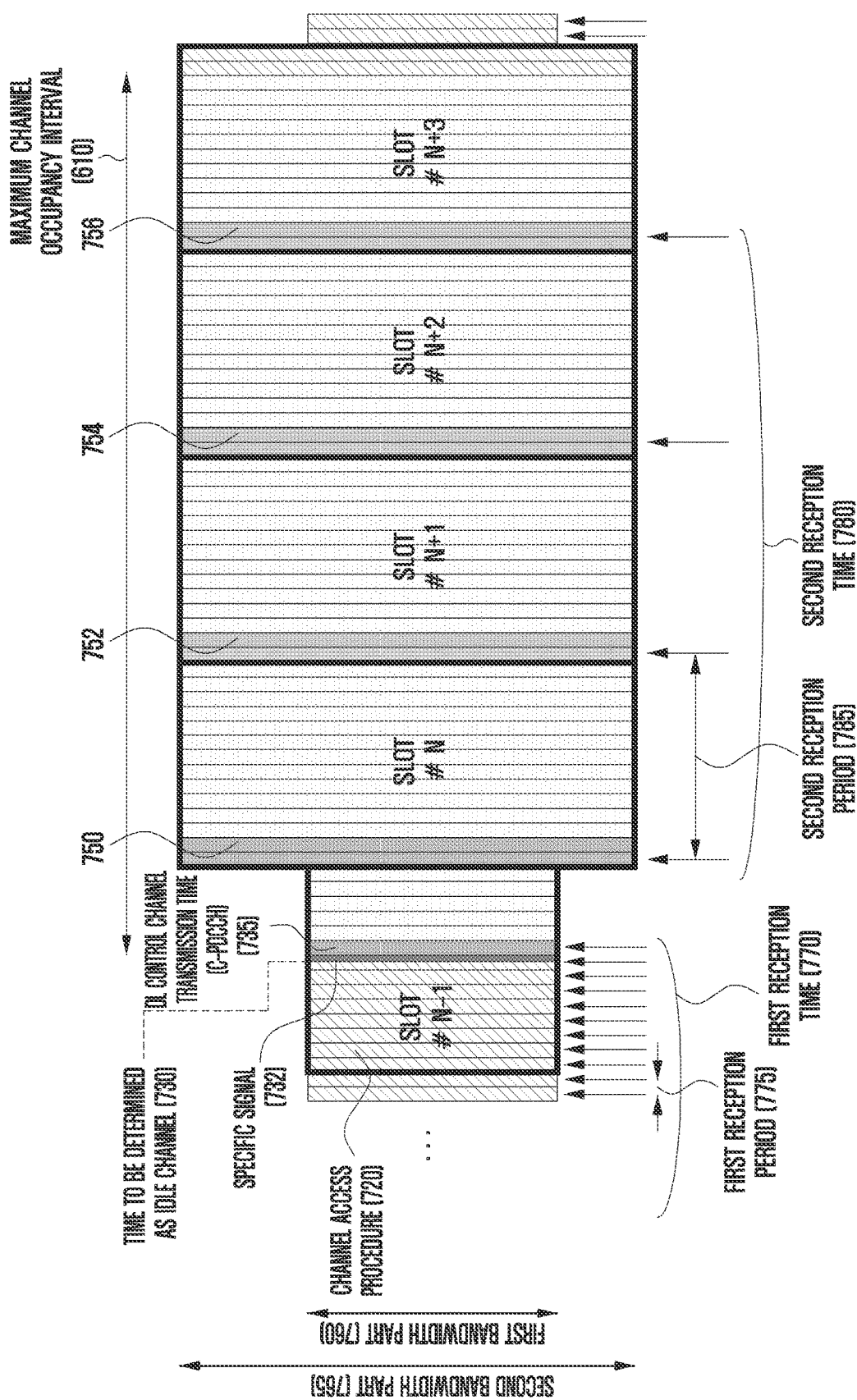
FIG. 7 illustrates another example of a downlink control channel reception time or period of a base station and a UE of the disclosure.

FIG. 7 illustrates another example of a downlink control channel reception time or period of a base station and a UE of the disclosure.

According to FIG. 7, for example, when a downlink control channel reception frequency band in a first signal reception time 770 or period 775 is referred to as a first bandwidth part (or a bandwidth part 760) and a downlink control channel reception frequency band in a second signal reception time 780 or period 785 is referred to as a second bandwidth part 765, the first bandwidth part and the second bandwidth part may be different from each other. At this time, the downlink control channel reception frequency band in the first signal reception time 770 or period 775 is different from the downlink control channel reception frequency band in the second signal reception time 780 or period 785. For example, the second bandwidth part 765 may be the maximum frequency band that the UE can support, or a frequency band that is predefined or configured through a higher-layer signal. The first bandwidth part 760 may be a minimum frequency band of the UE, a frequency band necessary for receiving a synchronization signal or a broadcast channel, or a frequency band predefined or configured through a higher-layer signal. In other words, the second bandwidth part 765 may be a frequency band that is larger than the first bandwidth part 760 and includes the first bandwidth part 760.

In general, when a UE receives a downlink signal by using a relatively small frequency band, the UE can reduce power consumption, compared to when the UE receives a downlink signal by using a relatively large frequency band. Accordingly, in order to reduce the power consumption of a general UE, it is effective for the UE to receive or monitor a downlink control channel by using a narrow frequency band (e.g. the first bandwidth part 760) and to receive a downlink data channel by using a broad frequency band (e.g. the second bandwidth part 765) when high-volume downlink data is required to be transmitted. However, the second bandwidth part 765 may be equal to or smaller than the first bandwidth part 760. Further, the content of the disclosure may be applied even when the first bandwidth part 760 and the second bandwidth part 765 partially overlap each other or are spaced apart from each other without overlapping each other.

When the downlink control channel reception time or period is configured differently according to the frequency band or the bandwidth part as described above, in at least one bandwidth part, the UE receives or monitors a downlink control signal according to a downlink control signal reception interval or period configured in the bandwidth part. Further, in a downlink control signal reception interval or period configured in a bandwidth part other than the bandwidth part, the UE may not receive a downlink control channel in the bandwidth part until the bandwidth part other than the bandwidth part is used or activated.

For example, in FIG. 7, a UE may receive a configuration (e.g., frequency domain information for each bandwidth part) relating to the first bandwidth part 760 and the second bandwidth part 765 from the base station through a higher-layer signal. Further, a downlink control channel reception time or period for each bandwidth part may also be configured through a higher-layer signal from the base station. In other words, the UE may receive: a configuration relating to the first bandwidth part 760, a configuration relating to the downlink control channel reception time 770 or period 775 for the first bandwidth part 760, and configuration information relating to a resource in which a downlink control channel is to be received; and a configuration for the second bandwidth part 765, a configuration relating to the downlink control channel reception time 780 or period 785 and the downlink control channel for the second bandwidth part 765, and configuration information relating to a resource in which a downlink control channel is to be received.

In this case, when the first bandwidth part 760 is previously defined or configured as a basic operation frequency band of the UE, the UE receives a downlink control channel according to the downlink control channel reception time 770 or period 775 for the first bandwidth part 760 until a separate instruction or signal is detected. At this time, the UE may not receive a downlink control channel in the downlink control channel reception time 780 or period 785 for the second bandwidth part 765. In this case, the UE may directly receive, through a higher-layer signal, a basic bandwidth part for the downlink control channel reception of the UE among the configured first bandwidth part 760 or the configured second bandwidth part 765. Alternatively, the UE may determine that a bandwidth part having an index in which the bandwidth part index representing the bandwidth part is the lowest is the basic bandwidth part of the UE. Further, in the above description, it is assumed that the UE has received a configuration for two bandwidth parts. However, the content of the disclosure may be applied even when the UE has received a configuration for two or more bandwidth parts.

Consideration will be given to the case in which the UE receives whether the UE has occupied the unlicensed band or information corresponding thereto (e.g. at least one of uplink or downlink transmission interval length or at least one piece of slot format indicator information) from the base station through the C-PDCCH, the second C-PDCCH, the UE-specific downlink control information, etc. proposed in the above embodiments, or to the case in which the UE receives an indicator indicating a change of a bandwidth part of the UE from the first bandwidth part 760 to the second bandwidth part 765 through a C-PDCCH, a second C-PDCCH, a UE-specific downlink control information, or a higher-layer signal including a MAC CE. The UE may receive a downlink control channel in the downlink control channel reception time 780 or period 785 for the second bandwidth part 765. At this time, while the UE receives the downlink control channel in the downlink control channel reception time 780 or period 785 for the second bandwidth part 765, the UE may not receive the downlink control channel in the downlink control channel reception time 770 or period 775 for the first bandwidth part 760.

Then, consideration will be given to the case in which the UE receives an indicator indicating a change of the bandwidth part of the UE from the second bandwidth part 765 to the first bandwidth part 760 from the base station through the C-PDCCH, the second C-PDCCH, the UE-specific downlink control information, or a higher-layer signal including MAC CE, etc. proposed in the above embodiments, or the case in which a predefined time passes after the bandwidth part of the UE is changed from a first bandwidth part 560 to a second bandwidth part 565. At this time, the UE receives a downlink control channel at the downlink control channel reception time 770 or period 775 for the first bandwidth part 760, and may not receive the downlink control channel at the downlink control channel reception time 780 or period 785 for the second bandwidth part 765.

Various embodiments of the disclosure includes: the base station operation for configuring the first signal reception time/period and the second signal reception time/period and indicating the configured time or period, and the UE operation for applying the same, described in the above embodiments; and a transmission method for an uplink or downlink transmission interval length or at least one piece of slot format indicator information transmitted in the C-PDCCH or second C-PDCCH, and a UE operation therefor. The contents described in the various embodiments of the disclosure are not limited to a specific embodiment, and may be applied to all of the embodiments of the disclosure. Therefore, unnecessary repetition of a description will be omitted by omitting a description of parts of the fourth embodiment that can be applied and determined using the contents described in the first, second, and third embodiments.

Figure 8:
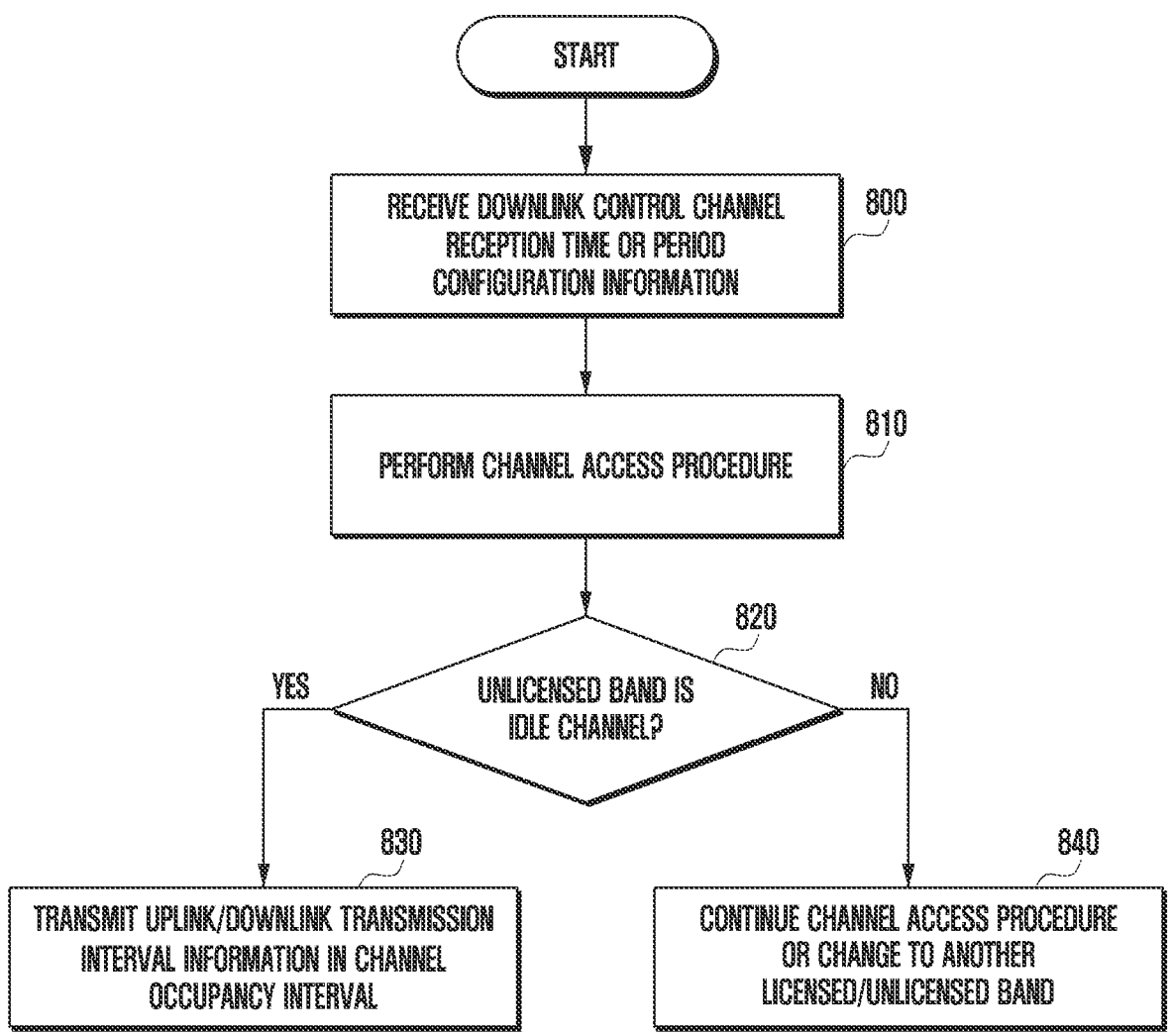
FIG. 8 is flowchart illustrating an operation of a base station according to embodiments of the disclosure.

FIG. 8 illustrates an operation of a base station according to embodiments of the disclosure.

The operation of the base station according to embodiments of the disclosure will be described with reference to FIG. 8. In step 800, for a UE, the base station may configure, through a higher-layer signal, at least one downlink control channel reception time or period and information (e.g. a time and frequency resource domain) about a resource domain in which the UE receives a downlink control channel. At least one downlink control channel reception time or period of the downlink control channel reception time or periods may be defined in advance between the base station and the UE. In addition, a downlink control channel reception time or period for transmitting specific downlink control information in common to one or more UEs, such as cell-specific or cell-common or UE-group-common downlink control information, and a downlink control channel reception time or period for UE-specific downlink control information transmission may be separately configured by the downlink control channel reception time or period configuration information. At this instance, the two downlink control channel reception times or periods may be configured to be identical to or different from each other. In step 800, the base station may configure one or more bandwidth parts to the UE, and may configure a downlink control channel reception time or period of each of the configured bandwidth parts. Also, the base station can configure information (e.g. a time and frequency resource domain) on a resource domain in which the UE receives a downlink control channel in each of the configured bandwidth parts.

Then, in step 810, the base station performs a channel access procedure for an unlicensed band. The channel access procedure performed by the base station in step 810 may be performed differently depending on the type of signal to be transmitted in the unlicensed band, for example, whether a downlink data channel is included in the transmission or whether an uplink data channel is included. For example, when a downlink data channel is not included in a signal to be transmitted by the base station in an unlicensed band (i.e. when only a downlink control channel is transmitted), the channel access procedure may be different from the channel access procedure when the downlink data channel is included in a signal to be transmitted by the base station in the unlicensed band.

The base station performs a channel access procedure for the unlicensed band in step 810 and determines in step 820 whether the unlicensed band is an idle channel. When it is determined that the unlicensed band is an idle channel, the base station may transmit a downlink signal in the unlicensed band in step 830. At this time, the downlink signal transmitted by the base station in the unlicensed band includes downlink control information including at least one piece of information on the uplink or downlink transmission interval within an interval in which the base station is to occupy a channel. At this time, the information on the uplink or downlink transmission interval refers to at least one among information on the length of an uplink or downlink transmission interval in a symbol or slot unit within the channel occupancy interval, information on an offset indicating a start symbol or slot of the uplink or downlink transmission interval, or slot format indicator information of at least one slot. In addition, when the downlink signal is transmitted in the unlicensed band, the base station may re-establish or change the downlink control channel reception time or period of at least one UE according to the method proposed by the disclosure, and may transmit a downlink control channel according to the reconfigured or changed downlink control channel reception time or period so as to allow the UE to correctly receive the downlink control channel.

When it is determined in step 820 that the unlicensed band is not an idle channel, the base station may, in step 840, resume or continue the channel access procedure for the unlicensed band without transmitting the downlink signal in the unlicensed band or may change a band to a licensed band or another unlicensed band so as to communicate with the UE.

Figure 9:
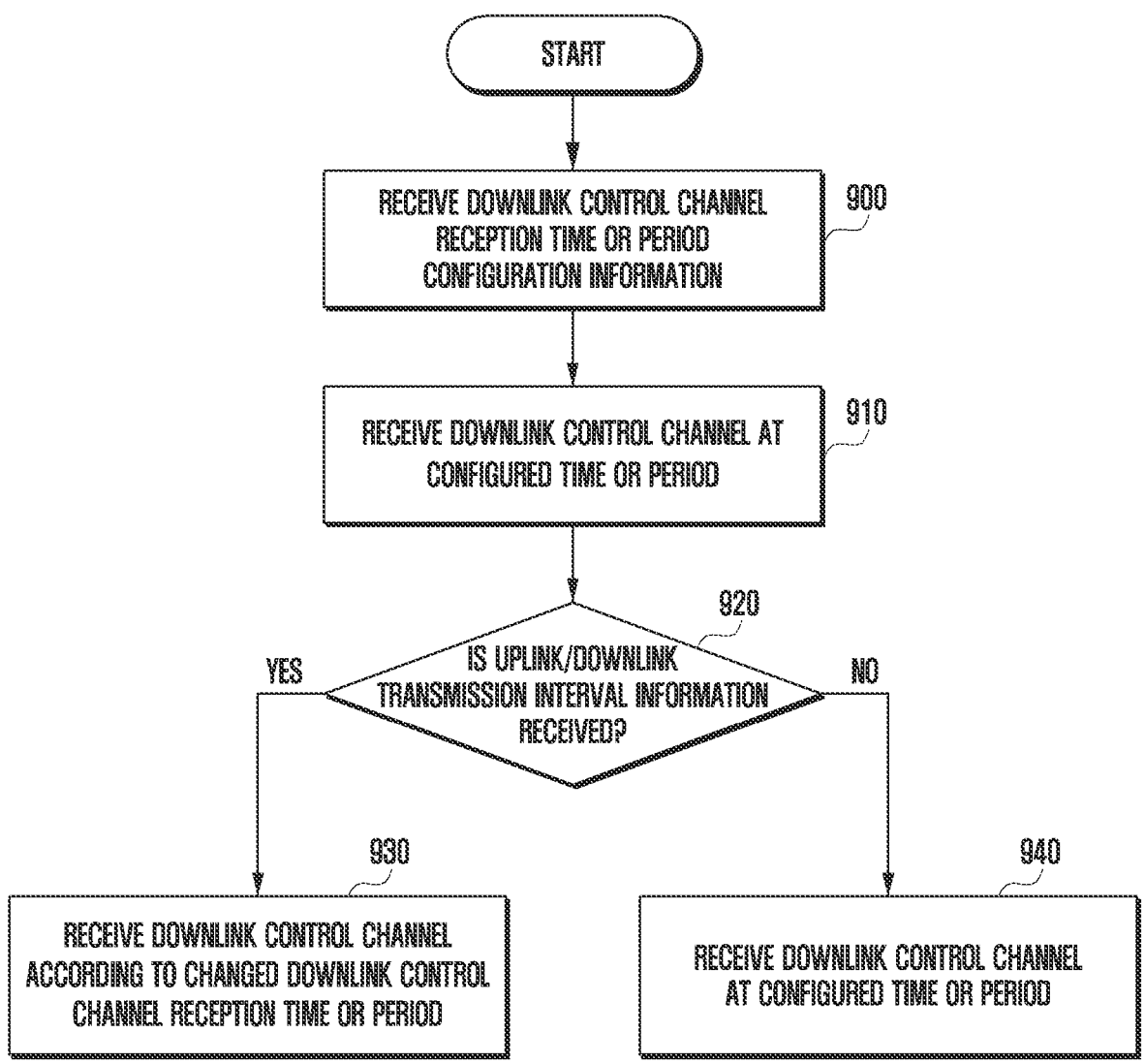
FIG. 9 is flowchart illustrating an operation of a UE according to embodiments of the disclosure.

FIG. 9 is a flowchart illustrating an operation of a UE according to embodiments of the disclosure.

An operation of a UE according to the disclosure will be described with reference to FIG. 9. In step 900, the UE may receive a configuration for at least one downlink control channel reception time or period from a base station through a higher-layer signal. At least one downlink control channel reception time or period of the downlink control channel reception times or periods may be defined in advance between the base station and the UE. In addition, a downlink control channel reception time or period for transmitting specific downlink control information in common to one or more UEs, such as cell-specific or cell-common or UE-group-common downlink control information, and a downlink control channel reception time or period for transmission of UE-specific downlink control information may be separately configured according to the downlink control channel reception time or period configuration information. In this instance, the two downlink control channel reception times or periods may be configured to be identical to or different from each other. In step 900, the UE may receive a configuration for one or more bandwidth parts from the base station, and may receive a configuration for a downlink control channel reception time or period in each of the configured bandwidth parts. In this instance, information (e.g. a time and frequency resource domain) about a resource domain in which the UE receives a downlink control channel in each of the configured bandwidth parts may be configured.

In step 910, the UE receives a downlink control channel according to the configured downlink control channel reception time or period. In step 920, the UE determines whether downlink control information has been transmitted from the base station to the UE. When the UE receives, from the base station, downlink control information including at least one piece of information on uplink or downlink transmission interval information within an interval in which the base station is to occupy the channel, the UE, in step 930, reconfigures or changes the downlink control channel reception time or period according to the method proposed by the disclosure, receives a downlink control channel according to the reconfigured or changed downlink control channel reception time or period, and determines whether the downlink control information has been transmitted to the UE from the base station.

When the UE fails to receive, from the base station, downlink control information including at least one piece of information on an uplink or downlink transmission interval within an interval in which the base station is to occupy the channel, the UE receives a downlink control channel according to the downlink control channel reception time or period configured in step 900, and determines whether the downlink control information has been transmitted from the base station to the UE. Here, the information on the uplink or downlink transmission interval refers to at least one among information on the length of an uplink or downlink transmission interval in a symbol or slot unit within the channel occupancy interval, information on an offset indicating a start symbol or slot of the uplink or downlink transmission interval, or slot format indicator information of at least one slot.

Figure 10:
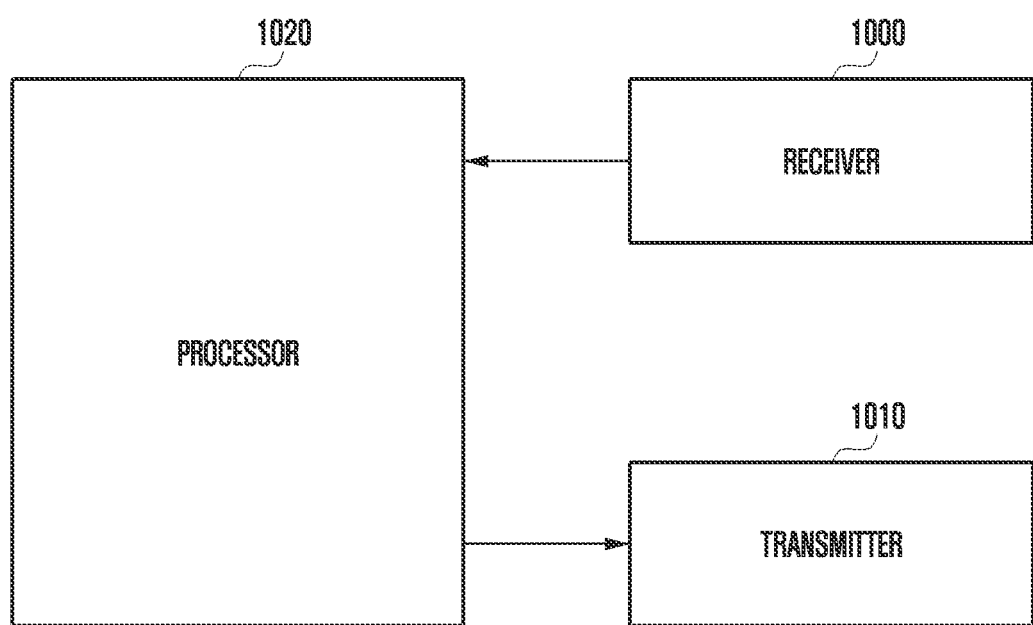
FIG. 10 is a block diagram illustrating a structure of a base station according to embodiments of the disclosure.
Figure 11:
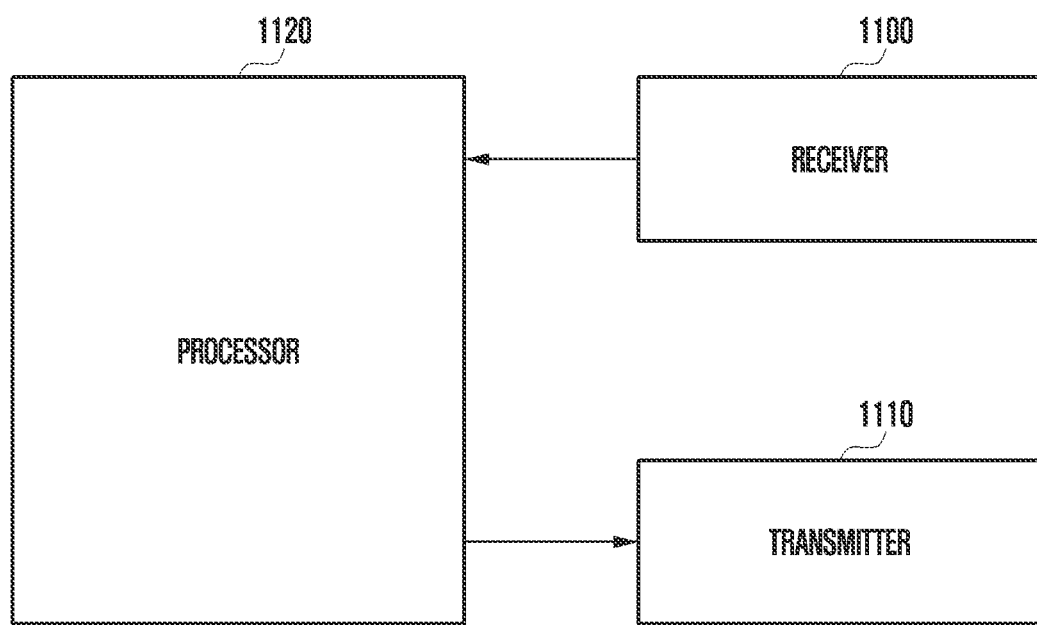
FIG. 11 is a block diagram illustrating a structure of a UE according to embodiments of the disclosure.

In order to perform the above-described embodiments of the disclosure, a transmitter, a receiver, and a processor of each of the UE and the base station are illustrated in FIGS. 10 and 11. In order to perform the above-described embodiments, the receiver, the processor, and the transmitter of each of the base station and the UE operate according to each embodiment.

Particularly, FIG. 10 is a block diagram illustrating the inner structure of a base station according to an embodiment of the disclosure. As illustrated in FIG. 10, the base station of the disclosure may include a receiver 1000, a transmitter 1010, and a processor 1020. The receiver 1000 and the transmitter 1010 may be collectively referred to as a transceiver in an embodiment of the disclosure. The transceiver may transmit and receive signals to and from the UE. The signal may include control information and data. To this end, the transceiver may include an RF transmitter for up-converting and amplifying the frequency of a transmitted signal, an RF receiver for low-noise amplifying a received signal and down-converting the frequency, and the like. Further, the transceiver may receive a signal through a wireless channel, output the signal to the processor 1020, and transmit the signal output from the processor 1020 through the wireless channel.

The processor 1020 may control a series of processes such that the base station can operate according to the above-described embodiments of the disclosure. For example, the receiver 1000 may receive a data signal including a control signal transmitted by the UE, and the processor 1020 may determine the result of reception of the control signal and the data signal transmitted by the UE. In another example, the processor 1020 may perform a channel access procedure for an unlicensed band. For example, the receiver 1000 may receive signals transmitted in the unlicensed band, and the processor 1020 may compare the strength of the received signal or the like based on a predetermined threshold value or the value of a function predetermined or having a bandwidth, etc. as factors to determine whether the unlicensed band is idle. When it is determined that the unlicensed band is idle, a downlink signal may be transmitted through the transmitter 1010. In this instance, the transmitter 1010 may transmit, to a UE, information on an uplink or downlink transmission interval within the channel occupancy interval of the unlicensed band determined by the processor 1020.

FIG. 11 is a block diagram illustrating an internal structure of a UE according to an exemplary embodiment of the disclosure. As illustrated in FIG. 11, the UE of the disclosure may include a receiver 1100, a transmitter 1110, and a processor 1120. The receiver 1100 and the transmitter 1110 may be collectively referred to as a transceiver in the embodiment of the disclosure. The transceiver may transmit and receive a signal to/from a base station. The signal may include control information and data. To this end, the transceiver may include an RF transmitter that up-converts and amplifies the frequency of a transmitted signal, an RF receiver that low-noise amplifies a received signal and down-converts the frequency, and the like. Further, the transceiver may receive a signal through a wireless channel, output the signal to the processor 1120, and transmit the signal output from the processor 1120 through the wireless channel.

The processor 1120 may control a series of processes such that the UE can operate according to the above-described embodiment of the disclosure. For example, the receiver 1100 may receive a data signal including a control signal, and the processor 1120 may determine the result of reception of the data signal. Thereafter, when a first signal reception result including the data reception should be transmitted to the base station in the timing, the transmitter 1110 transmits, to the base station, the first signal reception result in timing determined by the processor. In another example, when the receiver 1100 receives, from the base station, information on an uplink or downlink transmission interval within a channel occupancy interval of an unlicensed band, the processor 1120 may reconfigure or change a downlink control channel transmission time or period of the UE and thus the receiver 1100 may receive a downlink control channel transmitted by the base station.

Meanwhile, the embodiments of the disclosure disclosed in the specification and the drawings have been presented to easily explain technical contents of the disclosure and help comprehension of the disclosure, but do not limit the scope of the disclosure. That is, it will be obvious to those skilled in the art to which the disclosure belongs that other modifications based on the technical idea of the disclosure are possible. Further, the above embodiments may be combined with each other as needed. For example, some of the methods proposed in the disclosure may be combined with each other to operate the base station and the UE. Although the above embodiments are presented based on LTE and LTE-A systems, other modification examples based on the technical ideas of the above embodiments may be implemented in other systems such as 5G and NR systems.

What is claimed is:

1. A method performed by a terminal in a communication system, the method comprising:
   receiving, from a base station, search space configuration information including a first search space configuration associated with a first monitoring timing and a second search space configuration associated with a second monitoring timing;
   receiving, from the base station, downlink control information on a downlink control channel based on the first monitoring timing of the first search space configuration;
   monitoring the downlink control channel using the second monitoring timing of the second search space configuration and setting a value of a timer configured to the terminal; and
   in case that the timer expires, monitoring the downlink control channel using the first monitoring timing of the first search space configuration.

2. The method of claim 1, wherein the downlink control information includes an indicator indicating the second search space configuration.

3. The method of claim 1,
   wherein the monitoring the downlink control channel using the second monitoring timing starts in a slot after a number of symbols from the reception of the downlink control information, and
   wherein the number of symbols is indicated by switching delay information via higher layer signaling.

4. The method of claim 3, wherein the monitoring the downlink control channel using the first monitoring timing starts in a slot after the number of symbols from a time when the timer expires.

5. The method of claim 1, wherein the first search space configuration is for a non-channel occupancy interval and the second search space configuration is for a channel occupancy interval.

6. A method performed by a base station in a communication system, the method comprising:
   transmitting, to a terminal, search space configuration information including a first search space configuration associated with a first monitoring timing and a second search space configuration associated with a second monitoring timing; and
   transmitting, to the terminal, downlink control information on a downlink control channel based on the first monitoring timing of the first search space configuration,
   wherein the downlink control channel is monitored using the second monitoring timing of the second search space configuration and a value of a timer is set as a value configured to the terminal, and
   wherein in case that the timer expires, the downlink control channel is monitored using the first monitoring timing of the first search space configuration.

7. The method of claim 6, wherein the downlink control information includes an indicator indicating the second search space configuration.

8. The method of claim 6,
   wherein the downlink control channel is monitored using the second monitoring timing starts in a slot after a number of symbols from the transmission of the downlink control information, and
   wherein the number of symbols is indicated by switching delay information via higher layer signaling.

9. The method of claim 8, wherein the downlink control channel is monitored using the first monitoring timing starts in a slot after the number of symbols from a time when the timer expires.

10. The method of claim 6, wherein the first search space configuration is for a non-channel occupancy interval and the second search space configuration is for a channel occupancy interval.

11. A terminal in a communication system, the terminal comprising:
    a transceiver; and
    a controller coupled with the transceiver and configured to:
       receive, from a base station, search space configuration information including a first search space configuration associated with a first monitoring timing and a second search space configuration associated with a second monitoring timing,
       receive, from the base station, downlink control information on a downlink control channel based on the first monitoring timing of the first search space configuration,
       monitor the downlink control channel using the second monitoring timing of the second search space configuration and setting a value of a timer configured to the terminal, and
       in case that the timer expires, monitor the downlink control channel using the first monitoring timing of the first search space configuration.

12. The terminal of claim 11, wherein the downlink control information includes an indicator indicating the second search space configuration.

13. The terminal of claim 11,
    wherein the monitoring the downlink control channel using the second monitoring timing starts in a slot after a number of symbols from the reception of the downlink control information, and
    wherein the number of symbols is indicated by switching delay information via higher layer signaling.

14. The terminal of claim 13, wherein the monitoring the downlink control channel using the first monitoring timing starts in a slot after the number of symbols from a time when the timer expires.

15. The terminal of claim 11, wherein the first search space configuration is for a non-channel occupancy interval and the second search space configuration is for a channel occupancy interval.

16. A base station in a communication system, the base station comprising:
   a transceiver; and
   a controller coupled with the transceiver and configured to:
      transmit, to a terminal, search space configuration information including a first search space configuration associated with a first monitoring timing and a second search space configuration associated with a second monitoring timing, and
      transmit, to the terminal, downlink control information on a downlink control channel based on the first monitoring timing of the first search space configuration,
   wherein the downlink control channel is monitored using the second monitoring timing of the second search space configuration and a value of a timer is set as a value configured to the terminal, and
   wherein in case that the timer expires, the downlink control channel is monitored using the first monitoring timing of the first search space configuration.

17. The base station of claim 16, wherein the downlink control information includes an indicator indicating the second search space configuration.

18. The base station of claim 16,
   wherein the downlink control channel is monitored using the second monitoring timing starts in a slot after a number of symbols from the transmission of the downlink control information, and
   wherein the number of symbols is indicated by switching delay information via higher layer signaling.

19. The base station of claim 18, wherein the downlink control channel is monitored using the first monitoring timing starts in a slot after the number of symbols from a time when the timer expires.

20. The base station of claim 16, wherein the first search space configuration is for a non-channel occupancy interval and the second search space configuration is for a channel occupancy interval.

\* \* \* \* \*